US012564853B2

(12) United States Patent
Ishimaru et al.

(10) Patent No.: US 12,564,853 B2
(45) Date of Patent: Mar. 3, 2026

(54) DOOR OPENING/CLOSING ROBOT AND DOOR OPENING/CLOSING SYSTEM

(71) Applicant: KABUSHIKI KAISHA YASKAWA DENKI, Fukuoka (JP)

(72) Inventors: Yuji Ishimaru, Fukuoka (JP); Yoshiaki Miyazono, Fukuoka (JP); Tsuyoshi Ito, Fukuoka (JP); Katsuhiko Yoshino, Fukuoka (JP); Naoyuki Ohtsubo, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 436 days.

(21) Appl. No.: 18/112,749

(22) Filed: Feb. 22, 2023

(65) Prior Publication Data

US 2023/0271213 A1 Aug. 31, 2023

(30) Foreign Application Priority Data

Feb. 28, 2022 (JP) ................................. 2022-030039

(51) Int. Cl.
*B05B 13/02* (2006.01)
*B25J 9/04* (2006.01)
*B25J 11/00* (2006.01)

(52) U.S. Cl.
CPC ........... *B05B 13/0292* (2013.01); *B25J 9/042* (2013.01); *B25J 11/0075* (2013.01)

(58) Field of Classification Search
None
See application file for complete search history.

(56) References Cited

U.S. PATENT DOCUMENTS 4,342,535 A * 8/1982 Bartlett ............... B05B 13/0452
414/744.5
4,342,536 A * 8/1982 Akeel ................. B05B 13/0452
414/744.5
(Continued)

FOREIGN PATENT DOCUMENTS

JP S6490884 A 4/1989
JP 2011-098299 A 5/2011
(Continued)

OTHER PUBLICATIONS

An Office Action dated Jul. 22, 2025, issued from the Japanese Patent Office (JPO) of Japanese Patent Application No. 2022-030039 (Japanese counterpart of the present application) and EN Machine translation thereof. (8 pages).
(Continued)

*Primary Examiner* — Jethro M. Pence
(74) *Attorney, Agent, or Firm* — Venjuris, P.C.

(57) ABSTRACT

A door opening/closing robot includes: a base provided at a position different from a conveyance line on which a vehicle body is conveyed; a first arm attached to the base to rotate around a first axis and extending away from the first axis; a second arm attached to the first arm to rotate around a second axis and extending away from the second axis; a third arm attached to the second arm to rotate around a third axis and extending away from the third axis; and a fourth arm attached to the third arm to extend vertically and configured to vertically move a tool for holding a door of the vehicle body. At least a portion of a connection area including a distal end of the second arm and a proximal end of the third arm is positioned at a same height as at least a portion of the base.

38 Claims, 23 Drawing Sheets

(56) References Cited

U.S. PATENT DOCUMENTS

| | | | | |
|---|---|---|---|---|
| 4,498,414 | A * | 2/1985 | Kiba | B25J 9/0093 |
| | | | | 118/500 |
| 4,636,136 | A * | 1/1987 | Nomura | B62D 65/06 |
| | | | | 901/44 |
| 4,702,666 | A * | 10/1987 | Iwao | B05B 13/0452 |
| | | | | 414/730 |
| 4,721,630 | A * | 1/1988 | Takeo | B25J 15/00 |
| | | | | 427/427.2 |
| 4,768,462 | A * | 9/1988 | Kuronaga | B05B 13/0452 |
| | | | | 118/314 |
| 5,127,363 | A * | 7/1992 | Nakamura | B05B 15/555 |
| | | | | 118/704 |
| 5,192,593 | A * | 3/1993 | Matsuo | B05B 13/0292 |
| | | | | 427/427.2 |
| 5,286,160 | A * | 2/1994 | Akeel | B05B 13/0292 |
| | | | | 414/800 |
| 6,927,181 | B2 * | 8/2005 | Wakizako | B25J 18/04 |
| | | | | 414/940 |
| 7,798,094 | B2 * | 9/2010 | Meissner | B05B 13/0452 |
| | | | | 118/313 |
| 8,239,063 | B2 * | 8/2012 | Clifford | B05B 13/0431 |
| | | | | 901/49 |
| 8,726,830 | B2 * | 5/2014 | Herre | B05B 13/0292 |
| | | | | 901/49 |
| 8,726,832 | B2 * | 5/2014 | Krogedal | B25J 11/0075 |
| | | | | 118/321 |
| 9,266,440 | B2 * | 2/2016 | Gao | B60L 53/35 |
| 9,630,199 | B2 * | 4/2017 | Herre | B25J 19/0029 |
| 10,913,163 | B2 * | 2/2021 | Oshima | B05B 12/124 |
| 11,000,947 | B2 * | 5/2021 | Imle | B25J 9/0045 |
| 11,192,238 | B2 * | 12/2021 | Schreiner | B05C 15/00 |
| 11,213,955 | B2 * | 1/2022 | Nelson | B25J 9/162 |
| 11,383,258 | B2 * | 7/2022 | Clifford | B25J 19/0066 |
| 11,548,164 | B2 * | 1/2023 | Collmer | B25J 19/0075 |
| 11,554,382 | B2 * | 1/2023 | Jittu | B05D 1/02 |
| 11,707,756 | B2 * | 7/2023 | Yoshino | B05B 16/20 |
| | | | | 118/712 |
| 11,724,276 | B2 * | 8/2023 | Yoshino | B25J 5/02 |
| | | | | 427/427.2 |
| 11,872,686 | B2 * | 1/2024 | Konno | B25J 9/0084 |
| 12,290,828 | B2 * | 5/2025 | Yoshino | B05B 15/14 |
| 2008/0060575 | A1 * | 3/2008 | Meissner | B05B 13/0431 |
| | | | | 118/313 |
| 2010/0251963 | A1 * | 10/2010 | Herre | B05B 16/40 |
| | | | | 118/500 |
| 2012/0260854 | A1 * | 10/2012 | Takebe | B25J 9/0084 |
| | | | | 118/500 |
| 2012/0325142 | A1 * | 12/2012 | Takahashi | B05B 13/0452 |
| | | | | 901/29 |
| 2013/0034660 | A1 * | 2/2013 | Koyanagi | B05B 13/0452 |
| | | | | 118/620 |
| 2014/0069335 | A1 * | 3/2014 | Bania | B05B 13/0452 |
| | | | | 901/43 |
| 2014/0072397 | A1 * | 3/2014 | Mooring | H01L 21/67161 |
| | | | | 118/500 |
| 2016/0368137 | A1 * | 12/2016 | Yazawa | B25J 9/042 |
| 2018/0029064 | A1 * | 2/2018 | Bania | B05B 13/0452 |
| 2018/0221904 | A1 * | 8/2018 | Yoshino | B25J 9/042 |
| 2021/0146393 | A1 * | 5/2021 | Yoshino | B25J 9/0084 |
| 2023/0271214 | A1 * | 8/2023 | Yoshino | B25J 9/0093 |
| 2023/0338980 | A1 * | 10/2023 | Wehler | B05B 12/18 |
| 2024/0066696 | A1 * | 2/2024 | Fujisawa | B25J 9/0087 |

FOREIGN PATENT DOCUMENTS

| | | |
|---|---|---|
| JP | 2013-031890 A | 2/2013 |
| JP | 2018-126831 A | 8/2018 |
| JP | 2018167394 A | 11/2018 |
| JP | 6741900 B1 | 8/2020 |
| KR | 10-2017-0107525 A | 9/2017 |

OTHER PUBLICATIONS

An Office Action dated Nov. 19, 2025, issued from the Korean Intellectual Property Office (KIPO) of Korean Patent Application No. 10-2023-0023001(Korean counterpart of the present application) and a EN Machine translation thereof. (26 pages).

* cited by examiner

DOOR OPENING/CLOSING ROBOT AND DOOR OPENING/CLOSING SYSTEM

CROSS-REFERENCE TO RELATED APPLICATIONS

This application is based on and claims priority from Japanese Patent Application No. 2022-030039, filed on Feb. 28, 2022, with the Japan Patent Office, the disclosure of which is incorporated herein in its entirety by reference.

TECHNICAL FIELD

The present disclosure relates to a door opening/closing robot and a door opening/closing system.

BACKGROUND

Japanese Patent Laid-Open Publication No. 2018-126831 discloses a painting system including a plurality of painting robots painting vehicles being conveyed in a predetermined conveyance direction and an operation robot operating the opening/closing members of the vehicles, where the painting robots and the operation robot are fixed in a painting booth.

SUMMARY

The present disclosure provides a door opening/closing robot and a door opening/closing system, which are useful for a space saving.

According to an aspect of the present disclosure, a door opening/closing robot includes: a base provided at a position different from a conveyance line on which a vehicle body which is a work target is conveyed; a first arm attached to the base to rotate around a first axis extending along a vertical direction, and extending away from the first axis; a second arm attached to the first arm to rotate around a second axis parallel to the first axis, and extending away from the second axis; a third arm attached to the second arm to rotate around a third axis parallel to the first axis, and extending away from the third axis; and a fourth arm attached to the third arm to extend along the vertical direction at a distal end of the third arm, and configured to move a tool capable of holding a door attached to the vehicle body along the vertical direction, wherein in the vertical direction, at least a portion of a connection area including a distal end of the second arm and a proximal end of the third arm is positioned at the same height as at least a portion of the base.

According to an aspect of the present disclosure, a door opening/closing robot includes: a base provided at a position different from a conveyance line on which a work-target vehicle body is conveyed; a first arm attached to the base to rotate around a first axis extending along a vertical direction, and extending away from the first axis; a second arm attached to the first arm to rotate around a second axis parallel to the first axis, and extending away from the second axis; a third arm attached to the second arm to rotate around a third axis parallel to the first axis, and extending away from the third axis; and a fourth arm attached to the third arm to extend along the vertical direction at a distal end of the third arm, and configured to move a tool capable of holding a door attached to the vehicle body along the vertical direction. The fourth arm holds the tool to be movable in an up and down direction such that the tool passes through a window frame of the door. In the vertical direction, a connected portion between the third arm and the fourth arm is lower than an uppermost position of the second arm and the third arm. The second arm and the third arm are provided to operate below the door of the vehicle body that is being conveyed along the conveyance line. In the vertical direction, at least a portion of the distal end of the third arm and at least a portion of the second arm are positioned at a same height.

According to an aspect of the present disclosure, a door opening/closing system includes: the door opening/closing robot described above; a conveying apparatus configured to convey the vehicle body along the conveyance line; and a controller configured to control the door opening/closing robot to open/close the door of the vehicle body.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 12A and 12B are schematic views illustrating an embodiment of an operation of the door opening/closing robot.

FIGS. 13A and 13B are schematic views illustrating an embodiment of the operation of the door opening/closing robot.

FIGS. 15A and 15B are schematic views illustrating an embodiment of the operation of the door opening/closing robot.

FIGS. 16A and 16B are schematic views illustrating an embodiment of the operation of the door opening/closing robot.

DETAILED DESCRIPTION

Figure 1:
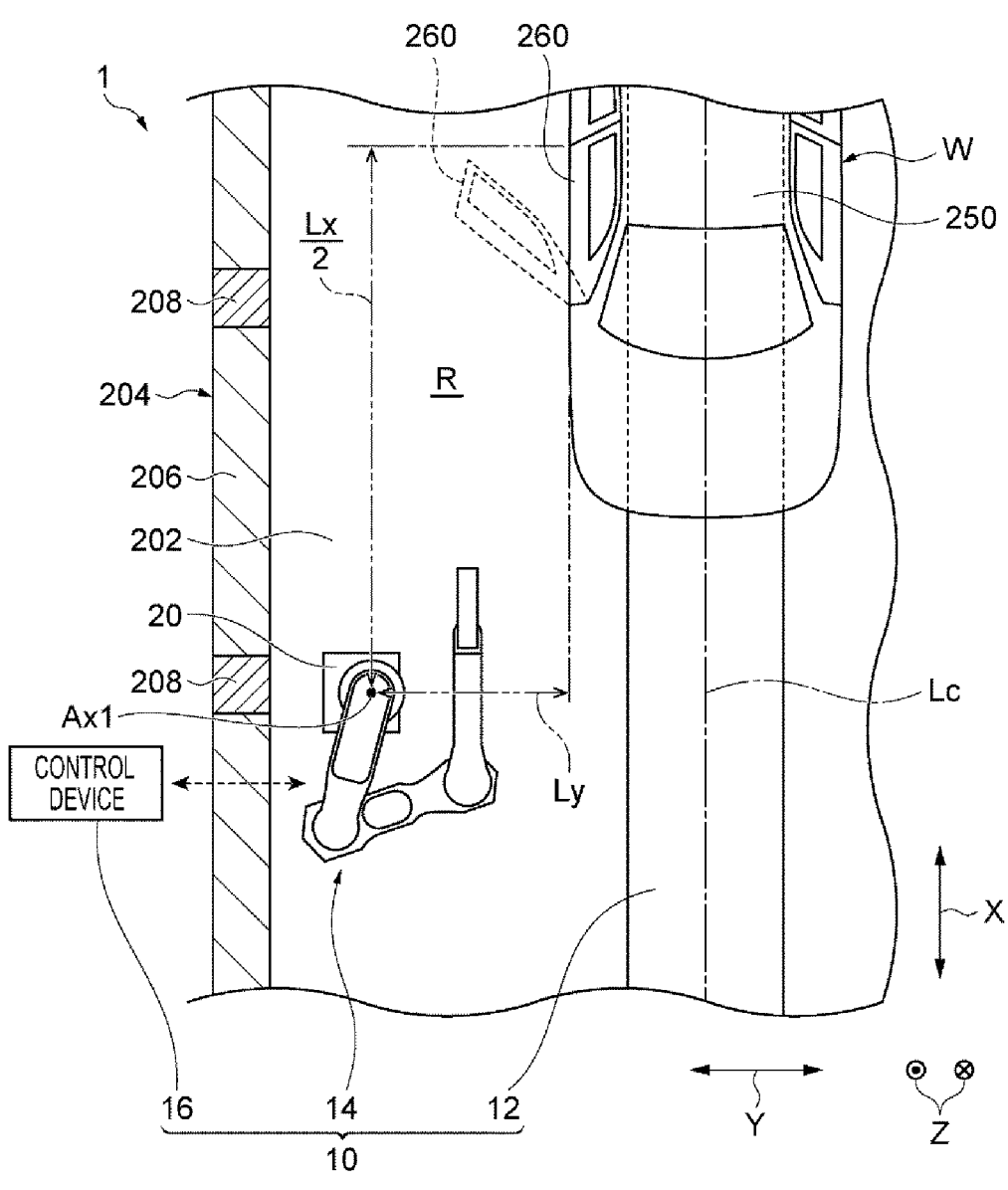
FIG. 1 is a schematic view illustrating an embodiment of a painting system provided with a door opening/closing robot.

In the following detailed description, reference is made to the accompanying drawings which form a part hereof. The illustrative embodiments described in the detailed description, drawings, and claims are not meant to be limiting. Other embodiments may be utilized, and other changes may be made without departing from the spirit or scope of the subject matter presented herein.

Hereinafter, embodiments will be described with reference to the drawings. In the description, the same components or components having the same function will be denoted by the same reference numerals, and overlapping descriptions thereof will be omitted.

A painting system 1 illustrated in FIG. 1 performs at least part of a painting work for a painting target (hereinafter, referred to as a "workpiece W"). The workpiece W includes a vehicle body 250 that makes up a passenger compartment of a vehicle (e.g., a four-wheel drive car), and doors 260 attached to the vehicle body 260. The workpiece W is a vehicle body in a state where components such as interior members, an engine, and windows have not been mounted. Each door 260 (e.g., a side door) is attached to the vehicle body 250 to be freely openable and closable with respect to the vehicle body 250. In an embodiment, two doors 260 are attached to each of the left and right side surfaces of the vehicle body 250 (e.g., both side surfaces of the vehicle body 250).

The painting system 1 is configured to perform a so-called interior panel painting. The portions to be painted by the painting system 1 include portions that need to be painted in a state where the door 260 is opened. The portions to be painted by the painting system 1 include, for example, the inner side of each door 260 and the center pillar provided between the pair of doors 260 arranged side by side in the front-rear direction. Hereinafter, the door 260 attached to the vehicle body 250 may be referred to as the "door 260 of the vehicle body 250." The door 260 may be a hinge door or a slide door. The two or more doors 260 provided on one side surface of the vehicle body 250 may be different types of doors.

The painting system 1 paints the workpiece W including the vehicle body 250 and the doors 260 while performing the opening/closing of the doors 260, in a state where the vehicle body 250 is being conveyed in a region for performing the painting work (e.g., inside a painting booth). The region for performing the painting work (hereinafter, referred to as a "painting region R") is defined by, for example, a booth bottom wall 202, a pair of booth side walls 204, and a booth ceiling. From the viewpoint of preventing the scattering of paint mist, the painting system 1 may form a downflow flowing downward from above in the painting region R.

The painting system 1 includes a conveying apparatus 12, a painting robot, a door opening/closing robot 14, and a control device 16. The conveying apparatus 12 is configured to convey the vehicle body 250 (e.g., the workpiece W) along a predetermined conveyance line Lc. The conveying apparatus 12 conveys the vehicle body 250 along the conveyance line Lc while maintaining the vehicle body 250 at a constant vertical height position. The speed of the conveyance by the conveying apparatus 12 may be constant. The conveying apparatus 12 may convey the vehicle body 250 in a state where the front thereof faces forward. The conveyance line Lc is a virtual horizontal set line. As the conveying apparatus 12 conveys the vehicle body 250 along the conveyance line Lc, the center of the vehicle body 250 in the width direction moves on the conveyance line Lc.

In the present disclosure, the horizontal direction in which the conveyance line Lc extends will be referred to as an "X-axis direction," and the horizontal direction orthogonal to the X-axis direction will be referred to as a "Y-axis direction." The X-axis direction corresponds to the longitudinal direction of the painting region R, and the Y-axis direction corresponds to the width direction of the painting region R. In the drawings, a Z-axis direction indicates the vertical direction perpendicular to both the X-axis and Y-axis directions. The terms "upstream" and "downstream" will be used with reference to the direction of the conveyance of the vehicle body 250 by the conveying apparatus 12. The conveying apparatus 12 conveys the vehicle body 250 W from an upstream side to a downstream side along the conveyance line Lc.

The conveying apparatus 12 is provided on the booth bottom wall 202 in the painting region R. The conveying apparatus 12 is, for example, a conveyor. The conveying apparatus 12 is disposed between the pair of booth side walls 204 in the Y-axis direction. Each of the pair of booth side walls 204 extends along the conveyance line Lc (e.g., extends along the X-axis direction). The conveying apparatus 12 may be disposed at the center between the pair of booth side walls 204 in the Y-axis direction. In the Y-axis direction, the distance between one of the booth side walls 204 and the conveyance line Lc may be substantially equal to the distance between the other booth side wall 204 and the conveyance line Lc. In the present disclosure, the distance between two members is defined as the shortest distance between the members. Each booth side wall 204 may include a plurality of support columns 208 and a wall body 206 disposed between two adjacent support columns 208.

The painting robot paints the workpiece W that is being conveyed by the conveying apparatus 12, in cooperation with the door opening/closing robot 14. The painting robot is, for example, a vertical articulated robot with six or more axes. The painting robot may be provided on the booth side wall 204 (e.g., a support column or a beam of the booth side wall 204). The painting robot is provided to paint the painting target portion of the door 260 when the door opening/closing robot 14 opens the door 260. The painting robot ejects (e.g., sprays) a paint from a painting gun attached to the tip end of a plurality of arms.

The door opening/closing robot 14 is disposed between the conveyance line Lc along which the vehicle body 250 of the work target is conveyed, and the booth side wall 204. The door opening/closing robot 14 is provided on the bottom surface of the booth bottom wall 202 between the side surface of the vehicle body 250 being conveyed along the conveyance line Lc and the booth side wall 204, or is provided on the booth side wall 204. The door opening/closing robot 14 is a horizontal articulated robot (e.g., a so-called SCARA robot). The door opening/closing robot 14 is configured to be capable of opening/closing the door 260 attached to the vehicle body 250.

Figure 2:
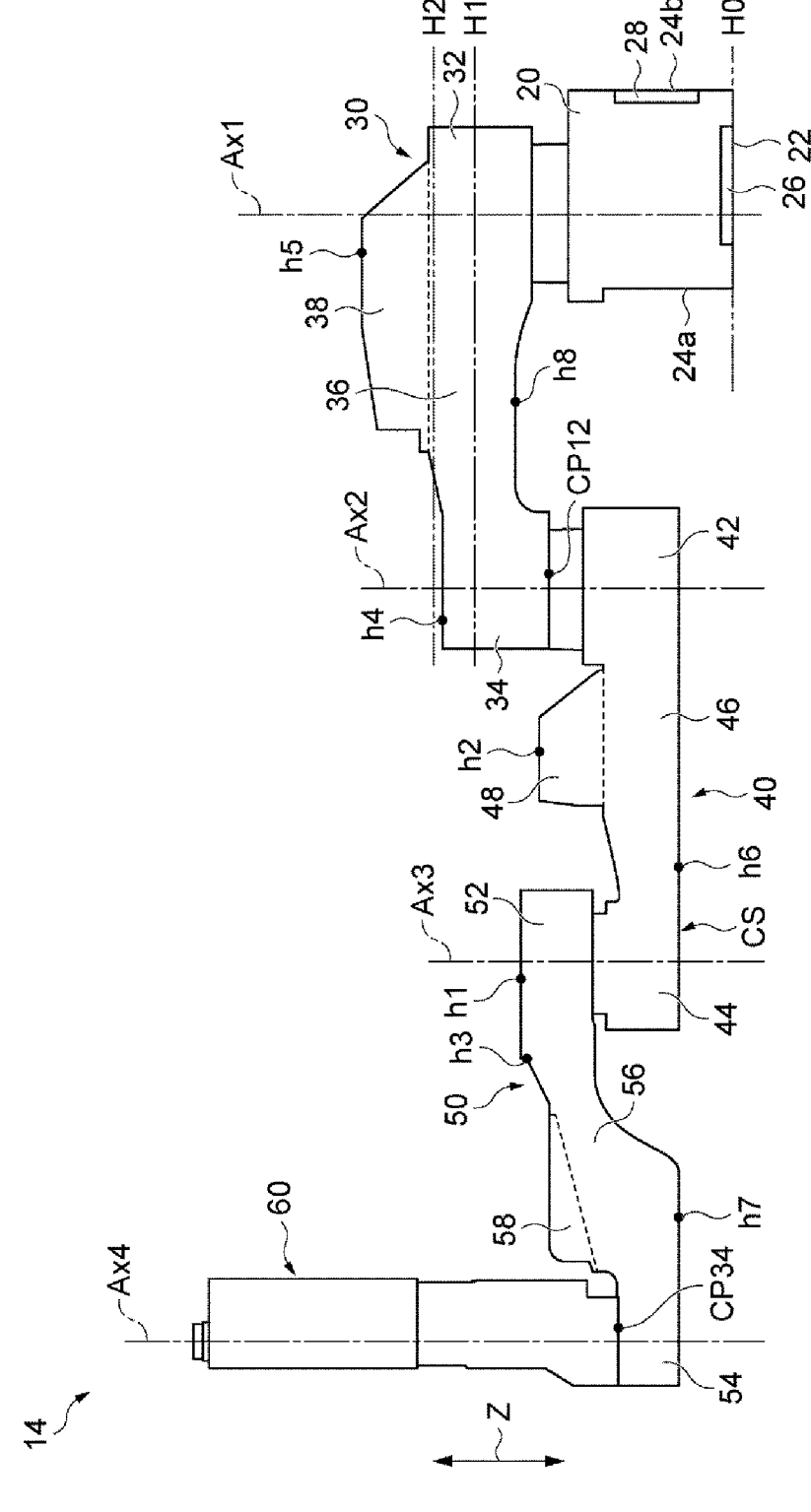
FIG. 2 is a side view illustrating an embodiment of the door opening/closing robot.
Figure 3:
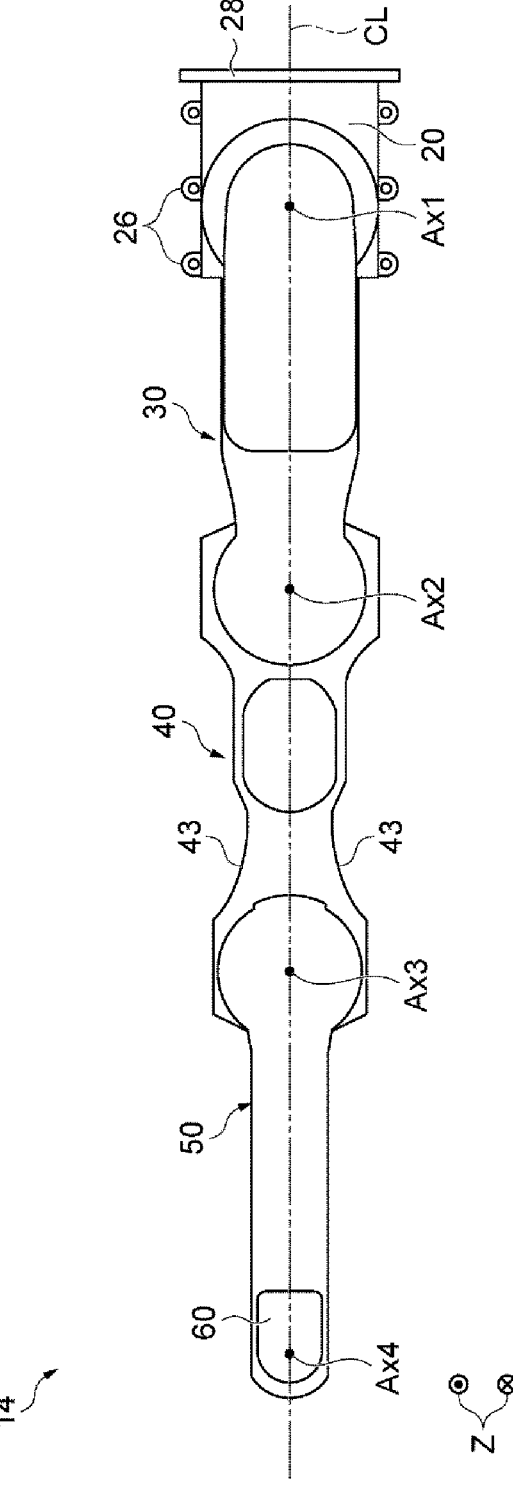
FIG. 3 is a top view illustrating an embodiment of the door opening/closing robot.

FIGS. 2 and 3 illustrate an embodiment of the door opening/closing robot 14. The door opening/closing robot 14 includes a base 20, a first arm 30, a second arm 40, a third arm 50, a fourth arm 60, and a tool 70.

The base 20 is a base portion that fixes the door opening/closing robot 14 at a predetermined position and supports a plurality of arms. The base 20 is provided at a position different from the conveyance line Lc. In the Y-axis direction, the base 20 is provided between the booth side wall 204 and the vehicle body 250 that is being conveyed along the conveyance line Lc (e.g., the side surface of the vehicle body 250 that faces the booth side wall 204). In the X-axis direction, the base 20 is provided within a range in which the vehicle body 250 is conveyed by the conveying apparatus 12. The vehicle body 250 is conveyed by the conveying apparatus 12 from a position of an upstream side of the base 20 to a position of a downstream side of the base 20 on the conveyance line Lc. In an embodiment, the conveying apparatus 12 moves the vehicle body 250 from a first predetermined position where the front end of the vehicle body 250 is positioned at an upstream side of the base 20 to a second predetermined position where the rear end of the vehicle body 250 is positioned at a downstream side of the base 20.

The base 20 is fixed to the booth bottom wall 202 or the booth side wall 204. Since the base 20 is fixed at a predetermined position, the door opening/closing robot 14 (e.g., the base 20) is fixed in the painting region R. Even when the workpiece W is conveyed by the conveying apparatus 12, the position of the base 20 in the painting region R does not change. The painting system 1 is not provided with an apparatus for conveying the door opening/closing robot 14 itself.

In the base 20, any of the bottom surface 22 and one side surface (e.g., the side surface 24b to be described later) may be configured to be attachable to a predetermined position. When the bottom surface 22 is attached, the base 20 is fixed to the booth bottom wall 202. When the side surface of the base 20 is attached, the base 20 is fixed to the booth side wall 204. Since any of the bottom surface 22 and the side surface of the base 20 is attachable, it is possible to select between fixing the bottom surface of the base 20 to the booth bottom wall 202 or fixing the side surface of the base 20 to the booth side wall 204.

The base 20 may be fixed to the booth bottom wall 202 or the booth side wall 204 via another member. When the base 20 is fixed to the booth bottom wall 202, a fixing member may be provided between the booth bottom wall 202 and the base 20, and when the base 20 is fixed to the booth side wall 204, a fixing member may be provided between the booth side wall 204 and the base 20. A configuration where the base 20 is fixed either to the booth bottom wall 202 or to the booth side wall 204 includes a case where the base 20 is substantially fixed via another member.

The base 20 includes, for example, an attachment portion 26 provided in the bottom surface 22 and an attachment portion 28 provided in the side surface. In an embodiment, the attachment portion 26 is fixed to the booth bottom wall 202 by a fixing member such as a bolt, or the attachment portion 28 is fixed to the booth side wall 204 by a fixing member such as a bolt. In the embodiment illustrated in FIG.

1, the bottom surface 22 of the base 20 is attached to the booth bottom wall 202 between the vehicle body 250 that is being conveyed along the conveyance line Lc and the booth side wall 204 that makes up the painting region R.

The first arm 30 is attached to the base 20 to rotate around a rotation axis Ax1 (e.g., a first axis) extending along the vertical direction. The rotation axis Ax1 is a vertical axis that extends in the vertical direction, and the first arm 30 may rotate around the rotation axis Ax1. The first arm 30 extends away from the rotation axis Ax1. The first arm 30 (e.g., the arm body of the first arm 30) extends in the direction intersecting the rotation axis Ax1 (e.g., the direction perpendicular to the rotation axis Ax1). The proximal end 32 of the first arm 30 may be attached to the base 20. The rotation axis Ax1 may pass through the proximal end 32 and the base 20. The proximal end 32 of the first arm 30 may be attached to the upper surface of the base 20.

The second arm 40 is attached to the first arm 30 to rotate around a rotation axis Ax2 (e.g., a second axis) parallel to the rotation axis Ax1. The term "parallel" includes not only being strictly parallel, but also being substantially parallel which permits a manufacturing error or an installation error. Similarly, the terms "vertical" and "perpendicular" also include being substantially vertical and substantially perpendicular. The rotation axis Ax2 is a vertical axis that extends in the vertical direction, and the second arm 40 may rotate around the rotation axis Ax2.

The second arm 40 extends away from the rotation axis Ax2. The second arm 40 (e.g., the arm body of the second arm 40) extends in the direction intersecting the rotation axis Ax2 (e.g., the direction perpendicular to the rotation axis Ax2). The proximal end 42 of the second arm 40 may be attached to the distal end 34 of the first arm 30. The rotation axis Ax2 may pass through the proximal end 42 of the second arm 40 and the distal end 34 of the first arm 30. The second arm 40 (e.g., the proximal end 42) may be attached to the lower surface of the distal end 34 of the first arm 30.

The third arm 50 is attached to the second arm 40 to rotate around a rotation axis Ax3 (e.g., a third axis) parallel to the rotation axis Ax1. The rotation axis Ax3 is a vertical axis that extends in the vertical direction, and the second arm 40 may rotate around the rotation axis Ax3. The third arm 50 extends away from the rotation axis Ax3. The third arm 50 (e.g., the arm body of the third arm 50) extends in the direction intersecting the rotation axis Ax3. The third arm 50 is formed to extend in one horizontal direction, when viewed in the vertical direction. The proximal end 52 of the second arm 50 may be attached to the distal end 44 of the second arm 40. The rotation axis Ax3 may pass through the proximal end 52 of the third arm 50 and the distal end 44 of the second arm 40. The third arm 50 (e.g., the proximal end 52) may be attached to the upper surface of the distal end 44 of the second arm 40.

The fourth arm 60 is attached to the third arm 50 to extend along the vertical direction. The fourth arm 60 is attached to the distal end 54 of the third arm 50. The fourth arm 60 vertically moves the tool 70 capable of holding the door 260 attached to the vehicle body 250. The tool 70 is attached to the fourth arm 60. The fourth arm 60 may be attached to the distal end 54 of the third arm 50 to rotate together with tool 70 around a rotation axis Ax4 (e.g., a fourth axis) parallel to the rotation axis Ax1.

The rotation axis Ax4 is a vertical axis that extends in the vertical direction, and the fourth arm 60 may rotate around the rotation axis Ax4. Along with the rotation of the fourth arm 60 around the rotation axis Ax4, the tool 70 rotates around the rotation axis Ax4. Details of the fourth arm 60 and the tool 70 will be described later.

In FIG. 2, "H0" indicates the height position of the booth bottom wall 202, "H1" indicates the height position of the lower end of the vehicle body 250 of the workpiece W being conveyed by the conveying apparatus 12, and "H2" indicates the height position of the lower end of the door 260 of the workpiece W. In the present disclosure, the height position indicates a position in the vertical direction. The terms "high" and "low" indicate a positional relationship between positions (e.g., height positions) in the vertical direction. Hereinafter, the height position of each arm will be described later.

At least a portion of a connection section that includes the distal end 44 of the second arm 40 and the proximal end 52 of the third arm 50 (hereinafter, referred to as a "connection section CS") is positioned at the same height as at least a portion of the base 20. For example, at least a portion of the connection section CS and the uppermost position of the base 20 are at the same height. In this case, the lowermost position of the base 20 may not be at the same height as the connection section CS. The lowermost position of the connection section CS may be higher than the lowermost position of the base 20. The uppermost position of a member indicates a position of the highest portion of the member, and the lowermost position of a member indicates a position of the lowest portion of the member. At least a portion of the distal end 44 of the second arm 40 may be positioned at the same height as at least a portion of the base 20, and at least a portion of the proximal end 52 of the third arm 50 may be positioned at the same height as at least a portion of the base 20.

Unlike the embodiment illustrated in FIG. 2, at least a portion of the connection section CS and the lowermost position of the base 20 may be at the same height, and the uppermost position of the base 20 may not be at the same height as the connection section CS. The uppermost position of the base 20 may be at the same height as at least a portion of the connection section CS, and the lowermost position of the base 20 may be at the same height as at least a portion of the connection section CS. At least a portion of the distal end 44 of the second arm 40 may be positioned at the same height as at least a portion of the base 20, and the proximal end 52 of the third arm 50 may not be positioned at the same height as the base 20. At least a portion of the proximal end 52 of the third arm 50 may be positioned at the same height as at least a portion of the base 20, and at least a portion of the distal end 44 of the second arm 40 may not be positioned at the same height as the base 20.

The second arm 40 and the third arm 50 may be provided to operate below the door 260 held by the tool 70. Operating below the door 260 indicates operating at a position lower than the lower end of the door 260. The arms may operate in a region vertically below the door 260, or may operate in a region different from the position of the door 260 in the horizontal direction. The second arm 40 and the third arm 50 may be provided at height positions where the arms may operate below the lower end of the door 260. The uppermost position h1 of the third arm 50 may be lower than the height position H2 of the lower end of the door 260 (e.g., the lowermost position of the door 260). The uppermost position h2 of the second arm 40 may be lower than the height position H2. The second arm 40 and the third arm 50 may be arranged below the door 260 in a case where the second arm 40 and the third arm 50 are moved to a position overlapping with the door 260 when viewed in the vertical direction.

The second arm 40 and the third arm 50 may be provided to operate below the vehicle body 250 that is being conveyed along the conveyance line Lc. The second arm 40 and the third arm 50 may be provided at height positions where the arms may operate below the lower end of the vehicle body 250. The uppermost position h1 of the third arm 50 may be lower than the height position H1 of the lower end of the vehicle body 250 (e.g., the lowermost position of the door 250). The uppermost position h2 of the second arm 40 may be lower than the height position H1 of the lower end of the vehicle body 250. The second arm 40 and the third arm 50 may be arranged below the door 250 in a case where the second arm 40 and the third arm 50 are moved to a position overlapping with the door 250 when viewed in the vertical direction.

The uppermost position of the portion of the second arm 40 other than the distal end 44 and the uppermost position h3 of the portion of the third arm 50 other than the proximal end 52 are lower than the uppermost position of the connection section CS. In the embodiment illustrated in FIG. 2, the uppermost position of the connection section CS corresponds to the uppermost position h1 of the third arm 50, and the uppermost position of the portion of the second arm 40 other than the distal end 44 corresponds to the uppermost position h2 of the second arm 40. As described above, the connection section CS may be the highest portion of the second arm 40 and the third arm 50.

A connected portion CP12 between the first arm 30 and the second arm 40 may be positioned at the same height as at least a portion of the connection section CS. The connected portion CP12 may be lower than the uppermost position of the connection section CS (e.g., the uppermost position h1), and may be higher than the lowermost position of the connection section CS. The connected portion CP12 is the portion of the first arm 30 to which the second arm 40 is connected (e.g., the portion where the second arm 40 is supported by the first arm 30).

A connected portion CP34 between the third arm 50 and the fourth arm 60 may be lower than the uppermost position of the second arm 40 and the third arm 50. The connected portion CP34 is the portion of the third arm 50 to which the fourth arm 60 is connected (e.g., the portion where the fourth arm 60 is supported by the third arm 50). The uppermost position of the second arm 40 and the third arm 50 indicates the uppermost position of the portion including both the second arm 40 and the third arm 50. In the embodiment illustrated in FIG. 2, the uppermost position of the second arm 40 and the third arm 50 corresponds to the uppermost position h1 of the third arm 50.

At least a portion of the distal end 54 of the third arm 50 and at least a portion of the second arm 40 may be positioned at the same height. For example, the lowermost position h6 of the second arm 40 may be at the same height as at least a portion of the distal end 54 of the third arm 50. The lowermost position of the distal end 54 of the third arm 50 may be at the same height as at least a portion of the second arm 40.

The distal end 54 of the third arm 50 may be lower than the proximal end 52. The uppermost position of the distal end 54 may be lower than the uppermost position of the proximal end 52 (e.g., the uppermost position h1). At least a portion of the intermediate section 56 of the third arm 50 between the proximal end 52 and the distal end 54 may extend obliquely downward from the proximal end 52. The uppermost position h2 of the second arm 40 may be lower than the highest position h8 on the lower surface of the intermediate section 36 of the first arm 30 between the proximal end 32 and the distal end 34.

At least a portion of the second arm 40 and at least a portion of the base 20 may be positioned at the same height. The lowermost position h6 of the second arm 40 and at least a portion of the base 20 may be at the same height. At least a portion of the proximal end 42 of the second arm 40 may be positioned at the same height as at least a portion of the base 20. At least a portion of the intermediate section 46 of the second arm 40 between the proximal end 42 and the distal end 44 may be positioned at the same height as at least a portion of the base 20.

At least a portion of the third arm 50 and at least a portion of the base 20 may be positioned at the same height. The lowermost position h7 of the third arm 50 and at least a portion of the base 20 may be at the same height. At least a portion of the distal end 54 of the third arm 50 may be positioned at the same height as at least a portion of the base 20. At least a portion of the intermediate section 56 of the third arm 50 may be positioned at the same height as at least a portion of the base 20.

The uppermost position h4 of the distal end 34 of the first arm 30 may be lower than the height position H2 of the lower end of the door 260 (e.g., the lowermost position of the door 260) of the vehicle body 250 that is being conveyed along the conveyance line Lc. The uppermost position h4 may be higher than the height position H2 of the lower end of the vehicle body 250 (e.g., the lowermost position of the vehicle body 250) that is being conveyed along the conveyance line Lc. At least a portion of the proximal end 32 of the first arm 30 may be positioned at the same height as the lowermost position of the door 260 (e.g., the height position H1) of the vehicle body 250 that is being conveyed along the conveyance line Lc. The uppermost position h5 of the first arm 50 may be higher than the height position HE The uppermost position h5 of the first arm 50 may be higher than the height position H2.

The uppermost position h2 of the second arm 40 and the uppermost position h1 of the third arm 50 may be lower than the uppermost position h4 of the distal end 34 of the first arm 30. The uppermost position h2 of the second arm 40 and the uppermost position h1 of the third arm 50 may be lower than the uppermost position h5 of the first arm 30.

The lowermost position h6 of the second arm 40 and the lowermost position h7 of the third arm 50 are higher than the booth bottom wall 2. The lowermost position h6 is higher than the height position H0, and the lowermost position h7 is higher than the height position H0. The second arm 40 and the third arm 50 may operate in a region defined by the portion of the booth bottom wall 202 between the vehicle body 250 on the conveyance line Lc and the booth side wall 204, and a virtual horizontal plane at the height position H2 (see, e.g., FIG. 6).

In the vertical direction, the lowermost position h6 of the second arm 40 and the lowermost position h7 of the third arm 50 may substantially coincide with each other. When the lowermost positions h6 and h7 substantially coincide with each other in the vertical direction, the difference in the vertical direction between the lowermost positions h6 and h7 is 200 mm or less. The difference in the vertical direction between the lowermost positions h6 and h7 may be 150 mm or less, 130 mm or less, or 100 mm or less. The lowermost positions h6 and h7 may be set such that the difference in the vertical direction between the lowermost positions h6 and h7 falls in a relatively small range, as compared with the arm length of each arm to be described later.

As illustrated in FIG. 3, at least one of the lateral portions 43 of the second arm 40 may be recessed (e.g., curved) toward an inward side. Each of the two lateral portions 43 of the second arm 40 may be recessed toward an inward side. In the second arm 40, each of the side surfaces of the intermediate section 46 between the proximal end 42 and the distal end 44 may be positioned inside the virtual plane that connects the side surface of the proximal end 42 and the side surface of the distal end 44.

FIG. 3 illustrates the door opening/closing robot 14 in a state where the rotation axes Ax1, Ax2, Ax3, and Ax4 are aligned on a linear virtual line. When viewed in the vertical direction, the virtual line passing through the rotation axes Ax21, Ax22, Ax23, and Ax24 is defined as a center line CL. The door opening/closing robot 14 (e.g., the portions of the door opening/closing robot 20 other than the tool 70) may be substantially axisymmetric with respect to the center line CL.

Figure 4:
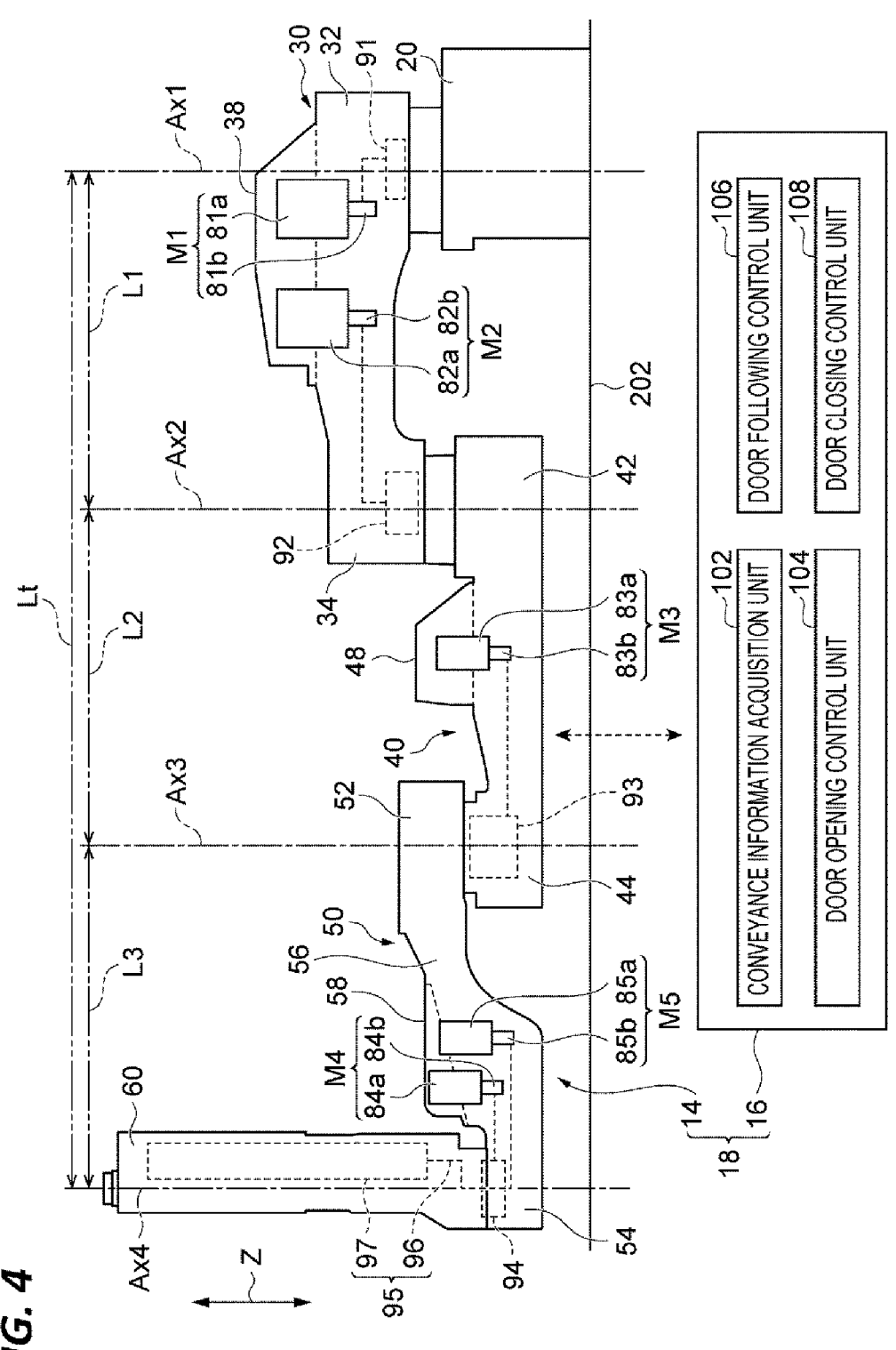
FIG. 4 is a schematic view illustrating an embodiment of an internal configuration of the door opening/closing robot and an embodiment of a functional configuration of a control device.

FIG. 4 schematically illustrates the inside of the door opening/closing robot 14. The pressure in at least a portion of the inside of the door opening/closing robot 14 may be higher than the pressure in the region outside the door opening/closing robot 14. This set up reduces the possibility that paint mist enters the door opening/closing robot 14. Inside the door opening/closing robot 14, wires for supplying an electric power to motors and wires for transmitting signals among various sensors may be provided. The door opening/closing robot 14 includes motors M1 to M5 and driving devices 91 to 95.

The motor M1 (a first motor) generates a driving force (e.g., a first driving force) for rotating the first arm 30 around the rotation axis Ax1. The motor M1 may be disposed in the first arm 30. The motor M1 includes a motor body 81a (e.g., a first motor body) and an output shaft 81b (e.g., a first output shaft). In the first arm 30, the motor M1 is attached from above with the output shaft 81b directed downward. In a state where the motor M1 is attached, the motor body 81a may be positioned vertically above the output shaft 81b. The motor M1 may be removably attached to the arm body of the first arm 30.

The motor M1 may be disposed near the rotation axis Ax1 between the rotation axes Ax1 and Ax2. The distance between the motor M1 and the rotation axis Ax1 may be shorter than the distance between the motor M1 and the rotation axis Ax2. The driving device 91 transmits the driving force of the motor M1 to a first joint between the base 20 and the proximal end 32 of the first arm 30 to operate the first joint. The driving device 91 includes, for example, a gear and a speed reducer. The driving device 91 may include a belt and a pulley. The driving device 91 may be disposed in the first arm 30.

The motor M2 (e.g., a second motor) generates a driving force (e.g., a second driving force) for rotating the second arm 40 around the rotation axis Ax2. The motor M2 may be disposed in the first arm 30. The motor M2 includes a motor body 82a (e.g., a second motor body) and an output shaft 82b (e.g., a second output shaft). In the first arm 30, the motor M2 is attached from above with the output shaft 82b directed downward. In a state where the motor M2 is attached, the motor body 82a may be positioned vertically above the output shaft 82b. The motor M2 may be removably attached to the arm body of the first arm 30.

The motor M2 may be disposed near the rotation axis Ax1 between the rotation axes Ax1 and Ax2. The distance between the motor M2 and the rotation axis Ax1 may be shorter than the distance between the motor M2 and the rotation axis Ax2. The driving device 92 transmits the driving force of the motor M2 to a second joint between the distal end 34 of the first arm 30 and the proximal end 42 of the second arm 40 to operate the second joint. The driving device 92 includes, for example, a belt, a pulley, a gear, and a speed reducer. The driving device 92 may be disposed in the first arm 30.

In the first arm 30, the rotation axis Ax1, the motors M1 and M2, and the rotation axis Ax2 may be arranged side by side in this order. The first arm 30 may include a cover member 38 that covers the attached motors M1 and M2 from above. The cover member 38 is removably attached to the arm body of the first arm 30. The cover member 38 is disposed near the rotation axis Ax1 between the rotation axes Ax1 and Ax2.

The motor M3 (e.g., a third motor) generates a driving force (e.g., a third driving force) for rotating the third arm 50 around the rotation axis Ax3. The motor M3 may be disposed in the second arm 40. The motor M3 includes a motor body 83*a* (e.g., a third motor body) and an output shaft 83*b* (e.g., a third output shaft). In the second arm 40, the motor M3 is attached from above with the output shaft 83*b* directed downward. In a state where the motor M3 is attached, the motor body 83*a* may be positioned vertically above the output shaft 83*b*. The motor M3 may be removably attached to the arm body of the second arm 40.

The motor M3 may be disposed near the rotation axis Ax2 between the rotation axes Ax2 and Ax3. In the second arm 40, the motor M3 may be disposed such that the distance between the motor M3 and the rotation axis Ax2 is shorter than the distance between the motor M3 and the rotation axis Ax3. The driving device 93 transmits the driving force of the motor M3 to a third joint between the distal end 44 of the second arm 40 and the proximal end 52 of the third arm 50 to operate the second joint. The driving device 93 includes, for example, a belt, a pulley, a gear, and a speed reducer. The driving device 93 may be disposed in the second arm 40.

The second arm 40 may include a cover member 48 that covers the attached motor M3 from above. The cover member 48 is removably attached to the arm body of the second arm 40. The cover member 48 may be disposed near the rotation axis Ax2 between the rotation axes Ax2 and Ax3.

The motor M4 (e.g., a fourth motor) generates a driving force (e.g., a fourth driving force) for rotating the fourth arm 60 around the rotation axis Ax4. The motor M4 may be disposed in the third arm 50. The motor M4 includes a motor body 84*a* (e.g., a fourth motor body) and an output shaft 84*b* (e.g., a fourth output shaft). In the third arm 50, the motor M4 is attached from above with the output shaft 84*b* directed downward. In a state where the motor M4 is attached, the motor body 84*a* may be positioned vertically above the output shaft 84*b*. The motor M4 may be removably attached to the arm body of the third arm 50.

The motor M4 may be disposed at a position lower than the proximal end 52 of the third arm 50, in the intermediate section 56 between the proximal end 52 and the distal end 54 of the third arm 50. The driving device 94 transmits the driving force of the motor M4 to a fourth joint between the distal end 54 of the third arm 50 and the lower end of the fourth arm 60 to operate the fourth joint. The driving device 94 includes, for example, a belt, a pulley, a gear, and a speed reducer. The driving device 94 may be disposed in the fourth arm 60.

The motor M5 (e.g., a fifth motor) generates a driving force (e.g., a fifth driving force) for moving the tool 70 along the vertical direction. The motor M5 may be disposed in the third arm 50. The motor M5 includes a motor body 85*a* (e.g., a fifth motor body) and an output shaft 85*b* (e.g., a fifth output shaft). In the third arm 50, the motor M5 is attached from above with the output shaft 85*b* directed downward. In a state where the motor M5 is attached, the motor body 85*a* may be positioned vertically above the output shaft 85*b*. The motor M5 may be removably attached to the arm body of the third arm 50.

The motor M5 may be disposed at a position lower than the proximal end 52 in the intermediate section 56 of the third arm 50. The driving device 95 is included in the fourth arm 60, and moves up and down the portion that supports the tool 70, by the driving force generated by the motor M5. The driving device 95 includes a transmission device 96 and a lifting device 97. The transmission device 96 transmits the driving force of the motor M5 to the lifting device 97. The lifting device 97 is, for example, a ball screw, and converts the driving force (e.g., a rotational force) of the motor M5 transmitted via the transmission device 96, into a linear motion. The lifting device 97 is disposed in the fourth arm 60 (e.g., inside the fourth arm 60).

At least a portion of the motor M4 and at least a portion of the motor M5 are disposed in a dead space that is formed in the upper portion of the intermediate section 56 below the uppermost position of the proximal end 52 due to the structure in which the distal end 54 is lower than the proximal end 52. The third arm 50 may include a cover member 58 that covers the attached motors M4 and M5 from above. The cover member 58 is removably attached to the arm body of the third arm 50. No motor (e.g., no driving source) may be disposed in the fourth arm 60.

The arm length L1 of the first arm 30, the arm length L2 of the second arm 40, and the arm length L3 of the third arm 50 may be substantially equal to each other. The arm length L1 is the distance between the rotation axes Ax1 and Ax2. The arm length L2 is the distance between the rotation axes Ax2 and Ax3. The arm length L3 is the distance between the rotation axes Ax3 and Ax4.

The arm length L2 of the second arm 40 may be 0.9 to 1.1 times, 0.95 to 1.05 times, or 0.98 to 1.02 times the arm length L1 of the first arm 30. The arm length L3 of the third arm 50 may be 0.9 to 1.1 times, 0.95 to 1.05 times, or 0.98 to 1.02 times the arm length L1.

The door opening/closing robot 14 maintains the opened state of the door 260 while following the movement of the vehicle body 250, during the conveyance of the vehicle body 250. When the distances Lx and Ly and the total arm length Lt are defined as follows (see also, e.g., FIG. 1), the total arm length Lt may be set to meet the formula (1) below.

Distance Lx: Distance in which the vehicle body 250 (e.g., center pillar) moves during the entire time period when the door opening/closing robot 14 opens the door 260

Distance Ly: Distance in the Y-axis direction between the rotation axis Ax1 and the line along which the lateral side of the vehicle body 250 provided with the door 260 passes Total arm length Lt: Sum of the arm lengths L1, L2, and L3

$$Lt \geq \sqrt{(Lx/2)^2 + Ly^2} \qquad \text{[Equation 1]}$$

In an embodiment, when the distance Lx is 4,000 mm and the distance Ly is 1,200 mm, the total arm length Lt is set to 2,330 mm or longer. The total arm length Lt may be about 2,400 mm to about 2,700 mm Each of the arm lengths L1, L2, and L3 (e.g., each arm length) may be about 800 mm to 900 mm.

Figures 5A, 5B:
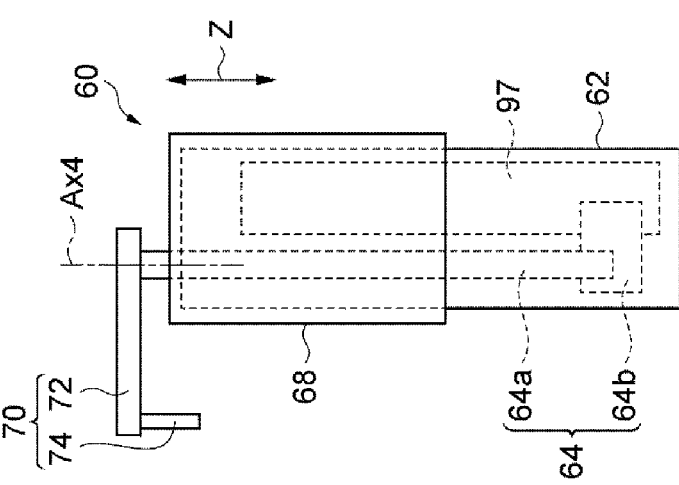
FIGS. 5A and 5B are schematic views illustrating an embodiment of a fourth arm and a tool.

FIGS. 5A and 5B illustrate the operation of the fourth arm 60 and the tool 70. The fourth arm 60 holds the tool 70 to be movable up and down such that the tool 70 may pass through the window frame 262 of the door 260 (e.g., the inside opening of the window frame 262). The fourth arm 60 provided with the lifting device 97 may move the tool 70 up and down to a height position at which at least a portion of the tool 70 may pass through the window frame 262.

The fourth arm 60 includes, for example, a fixed part 62 (e.g., a first part), a movable part 64 (e.g., a second part), and a cover 68. The fixed part 62 is attached to the distal end 54 of the third arm 50, and is rotatable around the rotation axis Ax4. The fixed part 62 is formed to extend vertically, and includes, for example, a housing that partially accommodates the lifting device 97 and the movable part 64. The movable part 64 is rotatable together with the fixed part 62 around the rotation axis Ax4 by the rotation of the fixed part 62, and is provided in the fixed part 62 to be movable up and down. The tool 70 is attached to the movable part 64.

As the position of the movable part 64 relative to the fixed part 62 changes in the vertical direction, the tool 70 attached to the movable part 64 moves up and down. The movable part 64 includes, for example, a tool holder 64*a* and a connector 64*b*. The tool holder 64*a* is formed in a bar shape that extends vertically. When viewed in the vertical direction, the center of the tool holder 64*a* substantially coincides with the rotation axis Ax4. The upper end of the tool holder 64*a* is exposed outside the fixed part 62. The tool 70 is attached to the upper end of the tool holder 64*a*. The connector 64*b* connects the tool holder 64*a* and a movable portion of the lifting device 97 (e.g., a ball screw nut) to each other.

The cover 68 is formed to cover at least a portion of the fixed part 62 from above. At least a portion of the cover 68 covers the upper end and the side surface of the fixed part 62. The cover 68 is attached to the tool holder 64*a* of the movable part 64, and moves up and down together with the movable part 64. The cover 68 may be formed to maintain the state of covering a portion of the fixed part 62 within a range in which the movable part 64 is movable up and down.

The tool 70 may be configured to pass through the window frame 262 of the door 260 (e.g., the inside opening of the window frame 262), and hold the inner side of the door 260. The tool 70 includes, for example, an extension part 72 and a holding part 74. The extension part 72 is formed to extend along the direction intersecting the vertical direction. The extension part 72 may extend linearly or in a curved shape along the intersecting direction. For example, the extension part 72 is connected at its lower end to the upper end of the tool holder 64*a*, and extends horizontally starting from the connected portion between the extension part 72 and the tool holder 64*a*.

The holding part 74 is connected to the extension part 72, and may come into contact with the inner surface 264 of the door 260. The holding part 74 extends downward from the extension part 72, starting from the connected portion between the extension part 72 and the holding part 74. For example, the holding part 74 is connected to the lower surface of the end of the extension part 72 away from the rotation axis Ax4. The holding part 74 may hold the door 260 by magnetically adsorbing the inner surface 264 of the door 260. The holding part 74 may include a permanent magnet, and may be formed in a cylindrical shape. The holding part 74 may be configured to be rotatable around an axis that extends along the extension direction of the holding part 74 and passes through the center of the holding part 74.

In the state illustrated in FIG. 5A, the tool 70 is positioned below the height position H3 of the lower end of the window frame 262 of the door 260. The lifting device 97 to which the driving force of the motor M5 is transmitted moves up the tool holder 64*a* and the connector 64*b*, thereby lifting the tool 70. As illustrated in FIG. 5B, the tool 70 is lifted until the lower end of the holding part 74 becomes higher than the height position H3 of the lower end of the window frame 262, so that the tool 70 may then pass through the window frame 262.

In a state where the opened area inside the window frame 262 and the holding part 74 face each other, the door opening/closing robot 14 operates each arm to make the rotation axis Ax4 approach the door 260, and move a portion of the tool 70 (e.g., the holding part 74) inside the door 260. Then, the fourth arm 60 provided with the lifting device 97 moves down the tool 70 such that the holding part 74 comes into contact the inner surface 264 of the door 260. In this way, the fourth arm 60 moves the tool 70 vertically such that the extension part 72 may pass through the window frame 262 in a state where the extension part 72 is lifted above the lower end of the window frame 262 of the door 260.

Figure 6:
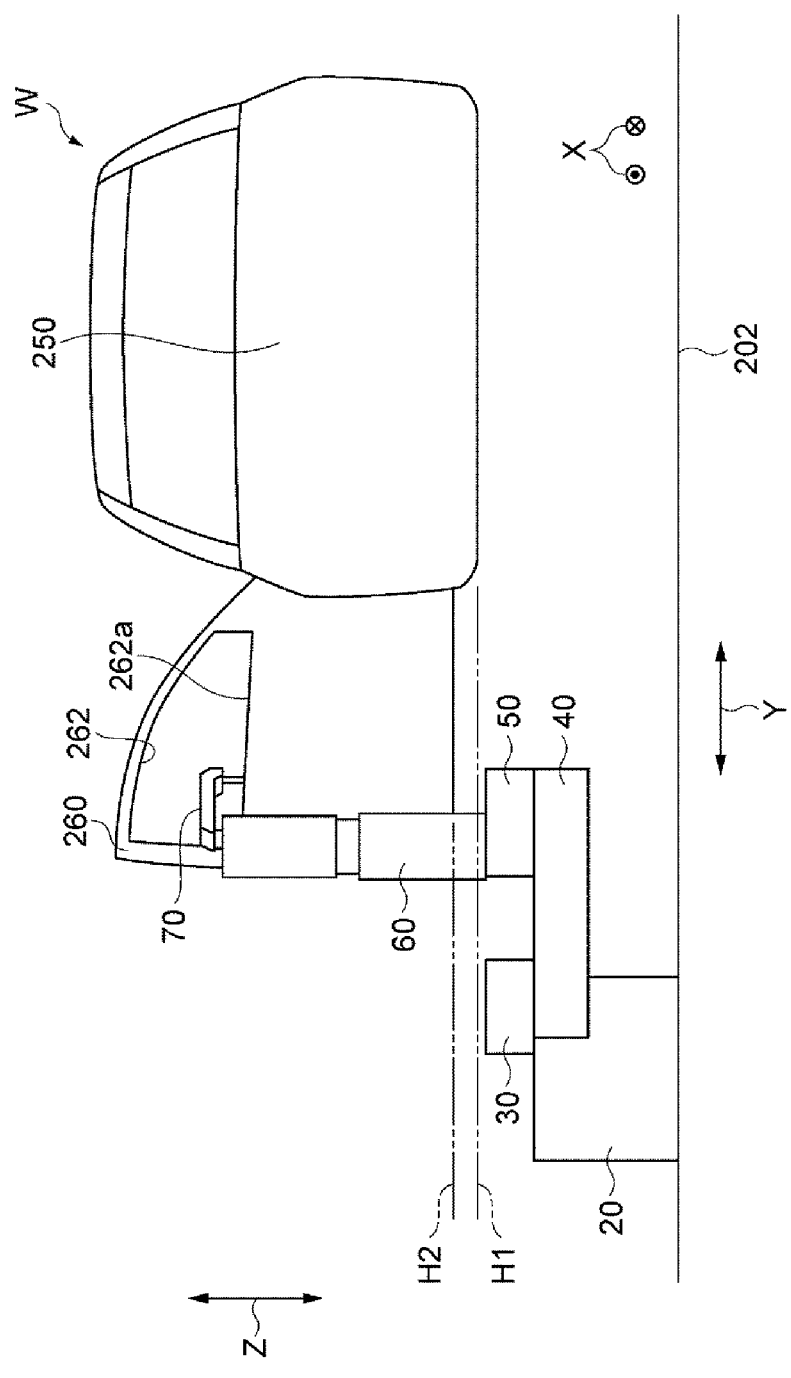
FIG. 6 is a side view schematically illustrating an embodiment of a height relationship between a workpiece and the door opening/closing robot.

In a state where the holding part 74 comes into contact with the inner surface 264 of the closed door 260, the door opening/closing robot 14 operates each arm to open the door 260. While the workpiece W is being conveyed along the conveyance line Lc, the door opening/closing robot 14 operates each arm to maintain the opened state of the door 260 while maintaining the state where the holding part 74 is in contact with the inner surface 264 of the door 260. In the state where the holding part 74 is in contact with the inner surface 264 of the opened door 260, the door opening/closing robot 14 operates each arm to close the door 260. FIG. 6 schematically illustrates a state where the holding part 74 of the tool 70 holds and opens the door 260.

Figure 7:
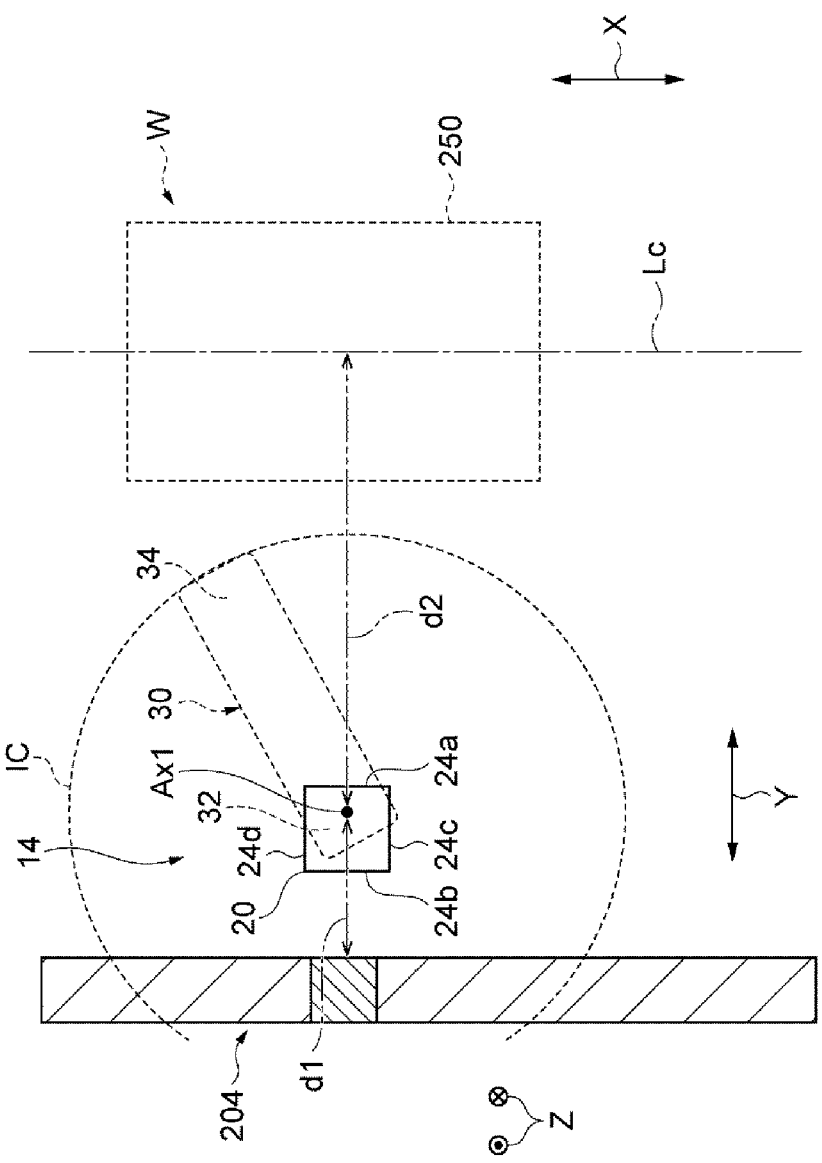
FIG. 7 is a top view schematically illustrating an embodiment of an installation position of the door opening/closing robot.

FIG. 7 schematically illustrates a portion of the door opening/closing robot 14 positioned between the booth side wall 204 and the conveyance line Lc. The base 20 may include a rectangular parallelepiped portion. As illustrated in FIG. 7, the rectangular parallelepiped portion of the base 20 includes four side surfaces when viewed in the vertical direction (e.g., when viewing the booth bottom wall 202 from above). The base 20 may be provided such that the four side surfaces thereof extend along the X-axis direction or the Y-axis direction. Of the pair of side surfaces along the X-axis direction, the side surface close to the conveyance line Lc (e.g., the front surface) will be referred to as the "side surface 24*a*," and the side surface close to the booth side wall 204 (e.g., the rear surface) will be referred to as the "side surface 24*b*." The pair of side surfaces along the Y-axis direction will be referred to as the "side surface 24*c*" and the "side surface 24*d*," respectively.

The base 20 may be provided such that its side surface having the shortest distance from the rotation axis Ax1 faces the conveyance line Lc when viewed in the vertical direction. In the embodiment illustrated in FIG. 7, the distance between the side surface 24*a* and the rotation axis Ax1 is shorter than the distance between the side surface 24*b* and the rotation axis Ax1, the distance between the side surface 24*c* and the rotation axis Ax1, and the distance between the side surface 24*d* and the rotation axis Ax1. The distance between the side surface 24*a* and the rotation axis Ax1 and the distance between the side surface 24*b* and the rotation axis Ax1 may be substantially equal to each other. In this case as well, since the side surface 24*a* is included in the side surfaces having the shortest distance from the rotation axis Ax1, the side surface having the shortest distance from the rotation axis Ax1 faces the conveyance line Lc.

The base 20 (e.g., the rotation axis Ax1) is disposed near the booth side wall 204 between the booth side wall 204 and the side surface of the vehicle body 250 being conveyed along the conveyance line Lc. The distance d1 in the Y-axis direction between the booth side wall 204 and the rotation axis Ax1 is shorter than the distance d2 in the Y-axis direction between the rotation axis Ax1 and the conveyance line Lc. The distance d1 may be ¼ times or less, ⅕ times or less, or ⅙ times or less the total value of the distances d1 and d2. In an embodiment, when the sum of the distances d1 and d2 is 2,500 mm to 3,000 mm, the distance d1 may be 600 mm or less, 550 mm or less, or 500 mm or less.

The base 20 may be disposed such that the distal end 34 of the first arm 30 does not overlap with the vehicle body 250 while the first arm 30 rotates around the rotation axis Ax1, when viewed in the vertical direction. The position of the base 20 (e.g., the rotation axis Ax1) may be set such that when a portion of the vehicle body 250 is disposed at the same position as the base 20 in the X-axis direction, the distal end 34 is not positioned below the vehicle body 250 or does not come into contact with the vehicle body 250 (e.g., the workpiece W with the door 260 closed) by the rotation of the first arm 30. FIG. 7 represents the rotation trajectory of the tip of the distal end 34 by "IC," and the base 20 may be provided such that the rotation trajectory IC does not overlap with the movement trajectory of the vehicle body 250 being conveyed by the conveying apparatus 12.

Figure 8:
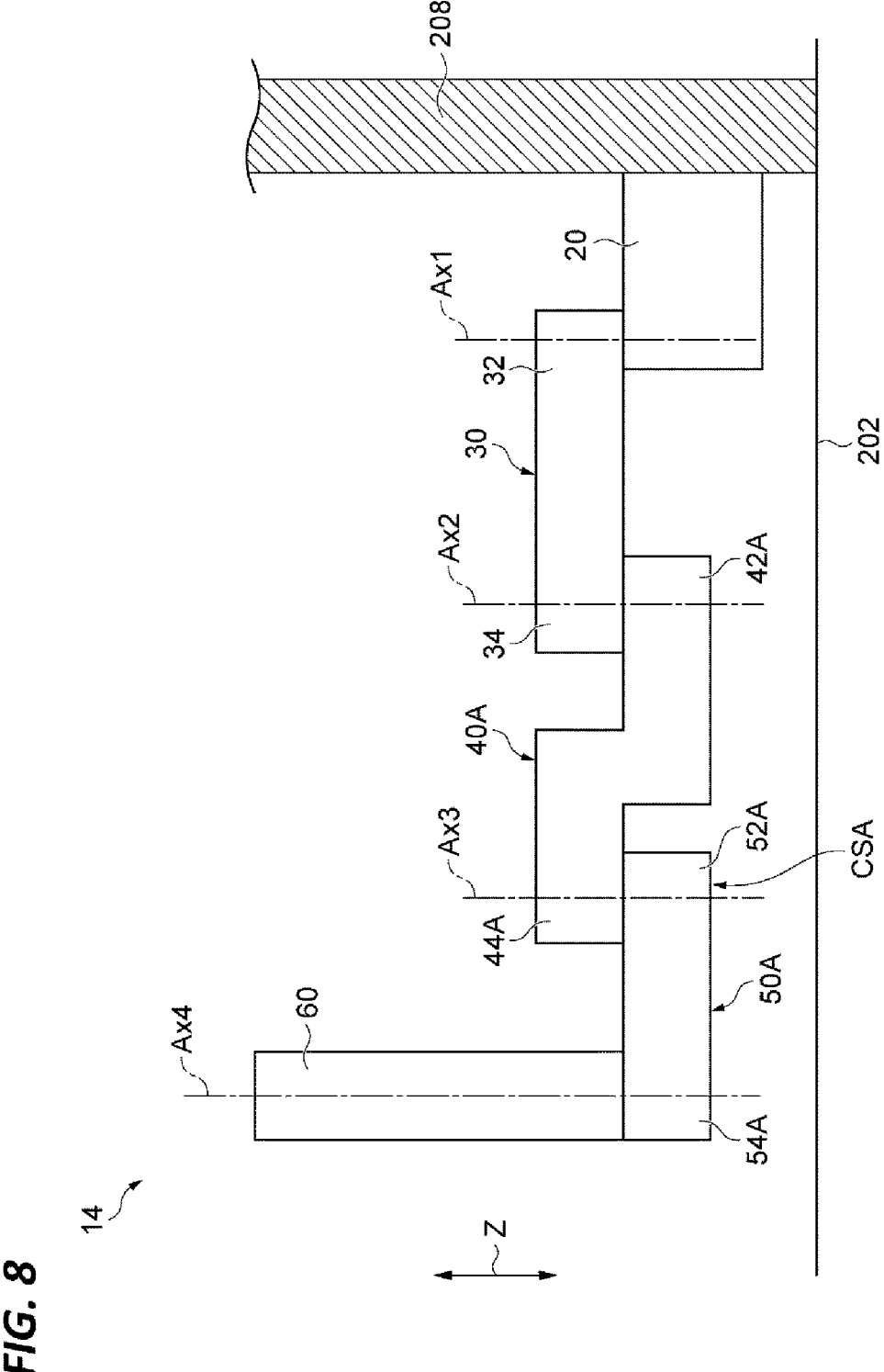
FIG. 8 is a side view schematically illustrating an embodiment of the door opening/closing robot.

The configuration of the door opening/closing robot 14 described above is an embodiment, and may be changed as appropriate. As illustrated in FIG. 8, the base 20 may be attached (e.g., fixed) to the support column 208 included in the booth side wall 204, instead of the booth bottom wall 202.

As illustrated in FIG. 8, the door opening/closing robot 14 may include a second arm 40A instead of the second arm 40, and may include a third arm 50A instead of the third arm 50. The second arm 40A is attached to the lower surface of the distal end 34 of the first arm 30, and extends away from the rotation axis Ax2. The proximal end 42A of the second arm 40A may be attached to the lower surface of the distal end 34 of the first arm 30. The third arm 50A is attached to the lower surface of the distal end 44A of the second arm 40A, and extends away from the rotation axis Ax3. The proximal end 52A of the third arm 50A may be attached to the lower surface of the distal end 44A of the second arm 40A.

The distal end 44A of the second arm 40A may be higher than the proximal end 42A of the second arm 40A. The uppermost position of the distal end 44A may be higher than the uppermost position of the proximal end 42A. In the connection section CS of the door opening/closing robot 14 illustrated in FIG. 2, the proximal end 52 of the third arm 50 is positioned vertically above the proximal end 42 of the second arm 40. Meanwhile, in a connection section including the distal end 44A of the second arm 40A and the proximal end 52A of the third arm 50A (hereinafter, referred to as a "connection section CSA"), the distal end 44A is positioned vertically above the proximal end 52A.

At least a portion of the connection section CSA and at least a portion of the base 20 are positioned at the same height. For example, at least a portion of the connection section CSA and the uppermost position of the base 20 are at the same height. Similar to the door opening/closing robot 14 illustrated in FIG. 2, the connected portion between the third arm 50A and the fourth arm 60 may be lower than the uppermost position of the second arm 40A and the third arm 50A. At least a portion of the distal end 54A of the third arm 50A and at least a portion of the second arm 40A may be positioned at the same height.

Each arm of the door opening/closing robot 14 including the second arm 40A and the third arm 50A may have the same height relationship with respect to the workpiece W, as the corresponding height relationship in the door opening/closing robot 14 illustrated in FIG. 2. In the door opening/closing robot 14 including the second arm 40A and the third arm 50A, the height relationship between the arms may be the same as the corresponding height relationship in the door opening/closing robot 14 illustrated in FIG. 2.

Figure 9:
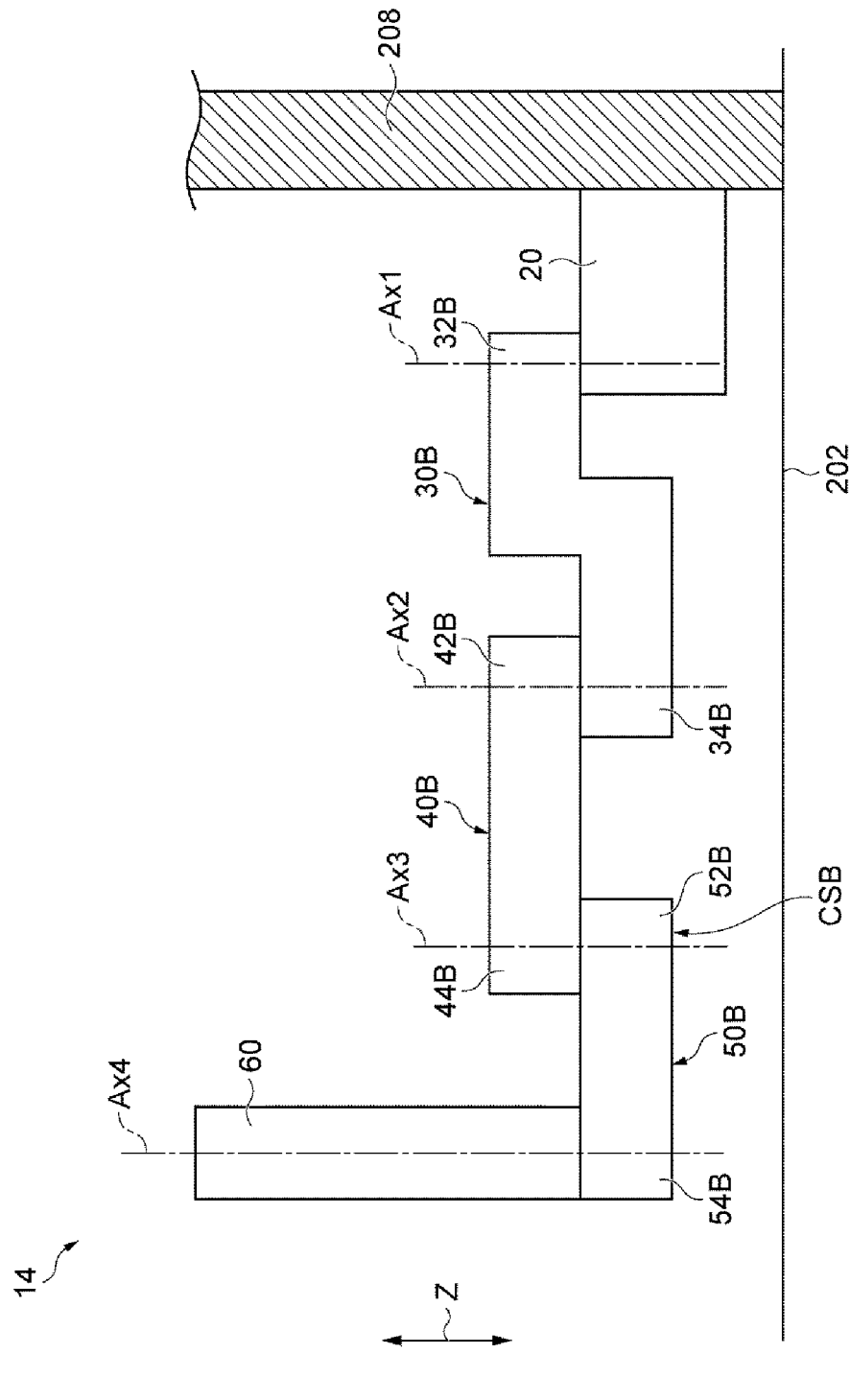
FIG. 9 is a side view schematically illustrating an embodiment of the door opening/closing robot.

As illustrated in FIG. 9, the door opening/closing robot 14 may include a first arm 30B instead of the first arm 30, a second arm 40B instead of the second arm 40, and a third arm 50B instead of the third arm 50. The proximal end 32B of the first arm 30B is attached to the base 20, and extends away from the rotation axis Ax1. The proximal end 32B of the first arm 30B may be attached to the upper surface of the base 20. The distal end 34B of the first arm 30B may be lower than the proximal end 32B of the first arm 30B. The uppermost position of the distal end 34B may be lower than the uppermost position of the proximal end 32B.

The second arm 40B is attached to the upper surface of the distal end 34B of the first arm 30B, and extends away from the rotation axis Ax2. The proximal end 42B of the second arm 40B may be attached to the upper surface of the distal end 34B of the first arm 30B. The third arm 50B is attached to the lower surface of the distal end 44B of the second arm 40B, and extends away from the rotation axis Ax3. The proximal end 52B of the third arm 50B may be attached to the lower surface of the distal end 44B of the second arm 40B.

At least a portion of a connection section including the distal end 44B of the second arm 40B and the proximal end 52B of the third arm 50B (hereinafter, referred to as a "connection section CSB"), and at least a portion of the base 20 are positioned at the same height. For example, at least a portion of the connection section CSB and the uppermost position of the base 20 are at the same height. Similar to the door opening/closing robot 14 illustrated in FIG. 2, the connected portion between the third arm 50B and the fourth arm 60 may be lower than the uppermost position of the second arm 40B and the third arm 50B. At least a portion of the distal end MB of the third arm 50B and at least a portion of the first arm 30B may be positioned at the same height.

Each arm of the door opening/closing robot 14 including the first arm 30B, the second arm 40B, and the third arm 50B may have the same height relationship with respect to the workpiece W, as the corresponding height relationship in the door opening/closing robot 14 illustrated in FIG. 2. In the door opening/closing robot 14 including the first arm 30B, the second arm 40B, and the third arm 50B, the height relationship among the arms may be the same as the corresponding height relationship in the door opening/closing robot 14 illustrated in FIG. 2.

The proximal end (32, 32B) of the first arm (30, 30B) may be attached to a portion of the base 20 other than the top portion of the base 20. The proximal end (32, 32B) of the first arm (30, 30B) may be attached to the lower surface of a portion of the base 20 that protrudes from the main body of the base 20. The proximal end (32, 32B) of the first arm (30, 30B) may be attached to the base 20 in the manner that the proximal end is inserted vertically between a pair of portions of the base 20 protruding from the main body of the base 20. When the base 20 is fixed to the booth side wall 204, the proximal end (32, 32B) of the first arm (30, 30B)

may be attached to the lower surface of the base 20. Some of the members included in the door opening/closing robot 14 illustrated in any one of FIGS. 2, 8, and 9 may be applied to the door opening/closing robot 14 illustrated in the other drawings.

Referring back to FIG. 1, the control device 16 is a computer device configured to control the door opening/closing robot 14 described above. In the painting system 1, a door opening/closing system 10 is configured with the conveying apparatus 12, the door opening/closing robot 14, and the control device 16. That is, the painting system 1 includes the door opening/closing system 10. The door opening/closing system 10 performs opening/closing the door 260 of the workpiece W and maintaining the opened state of the door 260, while conveying the workpiece W along the conveyance line Lc, such that the painting robot may perform the painting work. Hereinafter, descriptions will be made assuming that the door 260 is a hinge door, and the control device 16 controls the door opening/closing robot 14 illustrated in FIG. 2.

The control device 16 is configured to control the door opening/closing robot 14 such that the tool 70 opens the door 260 at an upstream side of the rotation axis Ax1 on the conveyance line Lc (e.g., in a direction of the conveyance line Lc). Further, the control device 16 is configured to control the door opening/closing robot 14 such that the opened state of the door 260 is maintained while the vehicle body 250 is being conveyed along the conveyance line Lc, and to control the door opening/closing robot 14 such that the tool 70 closes the door 260 at a downstream side of the rotation axis Ax1 on the conveyance line Lc.

As illustrated in FIG. 4, the control device 16 includes, as functional components (hereinafter, referred to as "functional modules"), for example, a conveyance information acquisition unit 102, a door opening control unit 104, and a door following control unit 106, and a door closing control unit 108. The processes executed by the functional modules correspond to the processes executed by the control device 16. A robot device 18 is configured with the door opening/closing robot 14 and the control device 16. That is, the painting system 1 includes the robot device 18.

The conveyance information acquisition unit 102 acquires information indicating the position of the vehicle body 250 that is being conveyed by the conveying apparatus 12 on the conveyance line Lc. The conveyance information acquisition unit 102 may repeat acquiring the information indicating the position of the vehicle body 250 in a predetermined period (e.g., every predetermined period). The conveyance information acquisition unit 102 acquires the information indicating the position of the vehicle body 250 from, for example, another control device or a host controller that controls the conveying apparatus 12.

The door opening control unit 104 controls the door opening/closing robot 14 such that the tool 70 opens the door 260 in a region of an upstream side of the rotation axis Ax1 on the conveyance line Lc. Hereinafter, the control of opening the closed door 260 by the door opening/closing robot 14 will be referred to as a "door opening control." In a case where the tool 70 opens the door 260 in the region of an upstream side of the rotation axis Ax1, the tool 70 (or the rotation axis Ax4) is positioned at an upstream side of the rotation axis Ax1 at the time when the tool 70 first holds the door 260 during the opening operation of the door 260.

The door opening control unit 104 may control the door opening/closing robot 14 such that the position of the tool 70 (or the rotation axis Ax4) is maintained in the region of an upstream side of the rotation axis Ax1 during the time period of performing the door opening control. The door opening control unit 104 may perform the door opening control before the most downstream end of the door 260 of the work target reaches the rotation axis Ax1 on the conveyance line Lc. The door opening control unit 104 performs the door opening control such that the door 260 is opened to, for example, a position substantially matching the maximum openable position.

The door following control unit 106 controls the door opening/closing robot 14 such that the opened state of the door 260 is maintained while the vehicle body 250 is being conveyed along the conveyance line Lc. Hereinafter, the control of maintaining the opened state of the door 260 by the door opening/closing robot 14 will be referred to as a "door following control." The door following control unit 106 performs the door following control after the door opening control is performed. The door following control unit 106 performs the door following control, for example, from the time point when the door 260 is opened to the position substantially matching the maximum openable position in the door opening control. The door following control unit 106 may continue the door following control from the time point when the door 260 is positioned at an upstream side of the rotation axis Ax1 to the time point when the door 260 is positioned at a downstream side of the rotation axis Ax1.

The door closing control unit 108 controls the door opening/closing robot 14 such that the tool 70 closes the door 260 in a region of a downstream side of the rotation axis Ax1 on the conveyance line Lc. Hereinafter, the control of closing the opened door 260 by the door opening/closing robot 14 will be referred to as a "door closing control." In a case where the tool 70 closes the door 260 in the region of a downstream side of the rotation axis Ax1, the tool 70 (or the rotation axis Ax4) is positioned in the region of a downstream side of the rotation axis Ax1 at the time point when the operation of closing the door 260 is started.

The door closing control unit 108 may control the door opening/closing robot 14 such that the position of the tool 70 (or the rotation axis Ax4) is maintained in the region of a downstream side of the rotation axis Ax1 during the time period of performing the door closing control. The door closing control unit 108 performs the door closing control after the door following control is performed. The door closing control unit 108 may perform the door closing control in a step where the most upstream end of the door 260 opened by the door following control passes the rotation axis Ax1, and then, reaches a predetermined set position on the conveyance line Lc. The door following control may be ended when the door closing control is started. In the closed state of the door 260, the door 260 is maintained at a predetermined position on the vehicle body 250 even though the tool 70 of the door opening/closing robot 14 does not hold the door 260.

Here, the series of controls including the door opening control, the door following control, and the door closing control will be referred to as an "opening/closing control." The control device 16 may store teaching information, and may perform the opening/closing control in the manner that the door opening/closing robot 14 operates according to the stored teaching information. An operator such as a worker generates the teaching information during a teaching step for teaching the operation of the door opening/closing robot 14, and the teaching information includes a program that defines an operation path of each arm.

The control device 16 performs the opening/closing control for at least one of the front door and the rear door attached to the vehicle body 250. Of the pair of doors 260 positioned on one side of the vehicle body 250, the door positioned at the forward side is the front door, and the door positioned at the rearward side of the front door is the rear door. The control device 16 may perform the opening/ closing control for the front door, and may perform the opening/closing control for the rear door.

Figure 10:
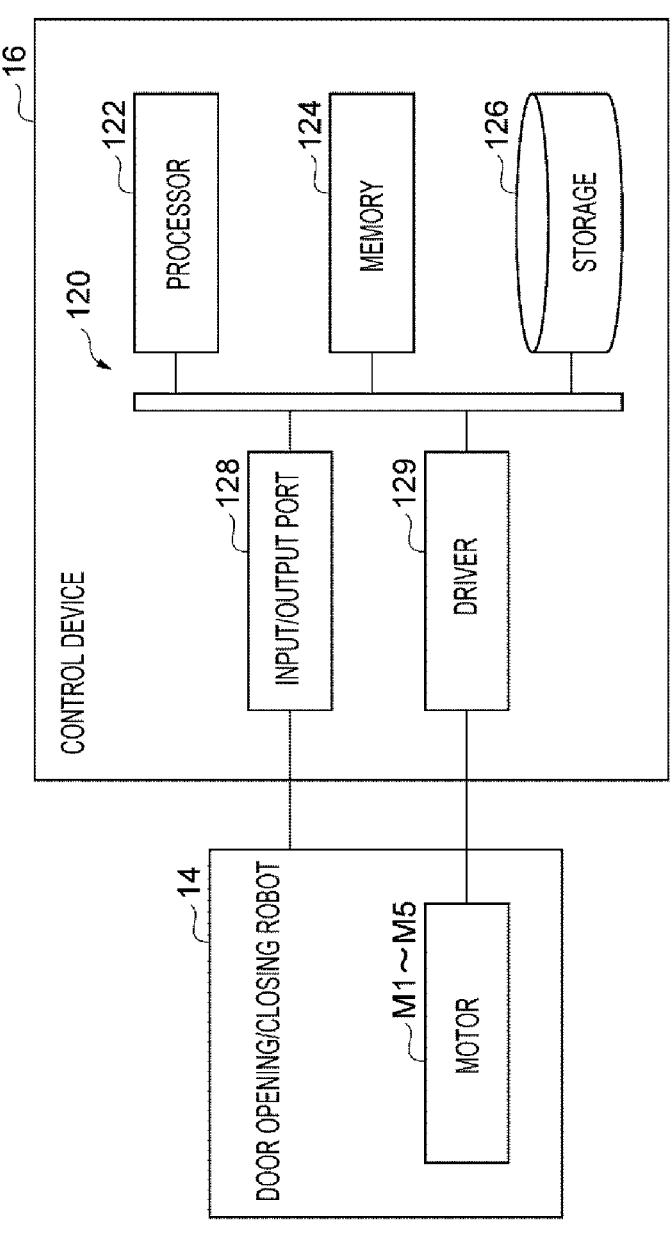
FIG. 10 is a block diagram illustrating an embodiment of a hardware configuration of the control device.

The control device 16 includes circuitry 120 as illustrated in FIG. 10. The circuitry 120 includes at least one processor 122, memory 124, storage 126, input/output port 128, and driver 129. The storage 126 is a computer-readable non-volatile storage medium (e.g., a flash memory). The storage 126 stores programs and data for causing the control device 16 to control the door opening/closing robot 14. The memory 124 temporarily stores, for example, programs loaded from the storage 126 and results of arithmetic operations executed by the processor 122.

The processor 122 implements the respective functional modules described above by executing the programs in cooperation with the memory 124. The driver 129 outputs driving powers to the motors M1 to M5 of the door opening/closing robot 14 according to commands from the processor 122. The input/output port 128 inputs/outputs electric signals to/from, for example, various devices (e.g., various sensors) included in the door opening/closing robot 14 according to commands from the processor 122. The control device 16 is not necessarily limited to implementing each function by a program. The control device 16 may implement at least part of the functions by, for example, a dedicated logic circuit or an application specific integrated circuit (ASIC) thereof.

Figure 11:
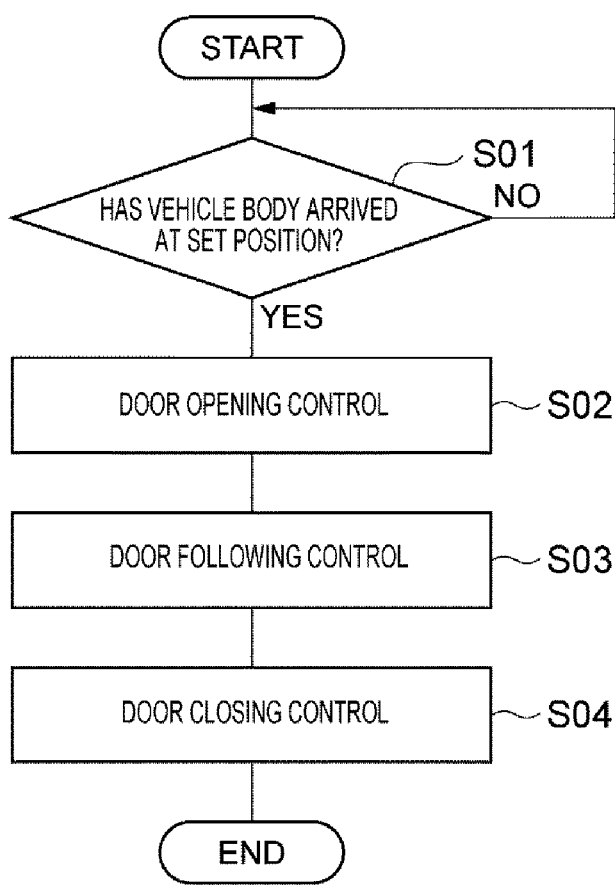
FIG. 11 is a flowchart illustrating an embodiment of a series of processes performed by the control device.

Next, the series of processes executed by the control device 16 will be described as an embodiment of a control method of the door opening/closing robot 14. FIG. 11 is a flowchart illustrating the series of processes executed by the control device 16 during the opening/closing control for one door 260. In the following, descriptions will be made assuming that the opening/closing control is performed for the door 260 positioned forward on the vehicle body 250. In the initial state, each arm of the door opening/closing robot 14 is arranged at a predetermined standby position, and the tool 70 is positioned at a predetermined height on the fourth arm 60.

The control device 16 first executes step S01. In step S01, the control device 16 waits until the vehicle body 250 of the work target arrives at the predetermined set position on the conveyance line Lc. The control device 16 may determine whether the vehicle body 250 has arrived at the predetermined set position, based on the information indicating the position of the vehicle body 250 periodically acquired by the conveyance information acquisition unit 102. The predetermined set position is set to a position of an upstream side of the base 20 on the conveyance line Lc. An operator such as a worker sets the set position in advance as a position for starting the opening of the door 260.

Figures 12A, 12B:
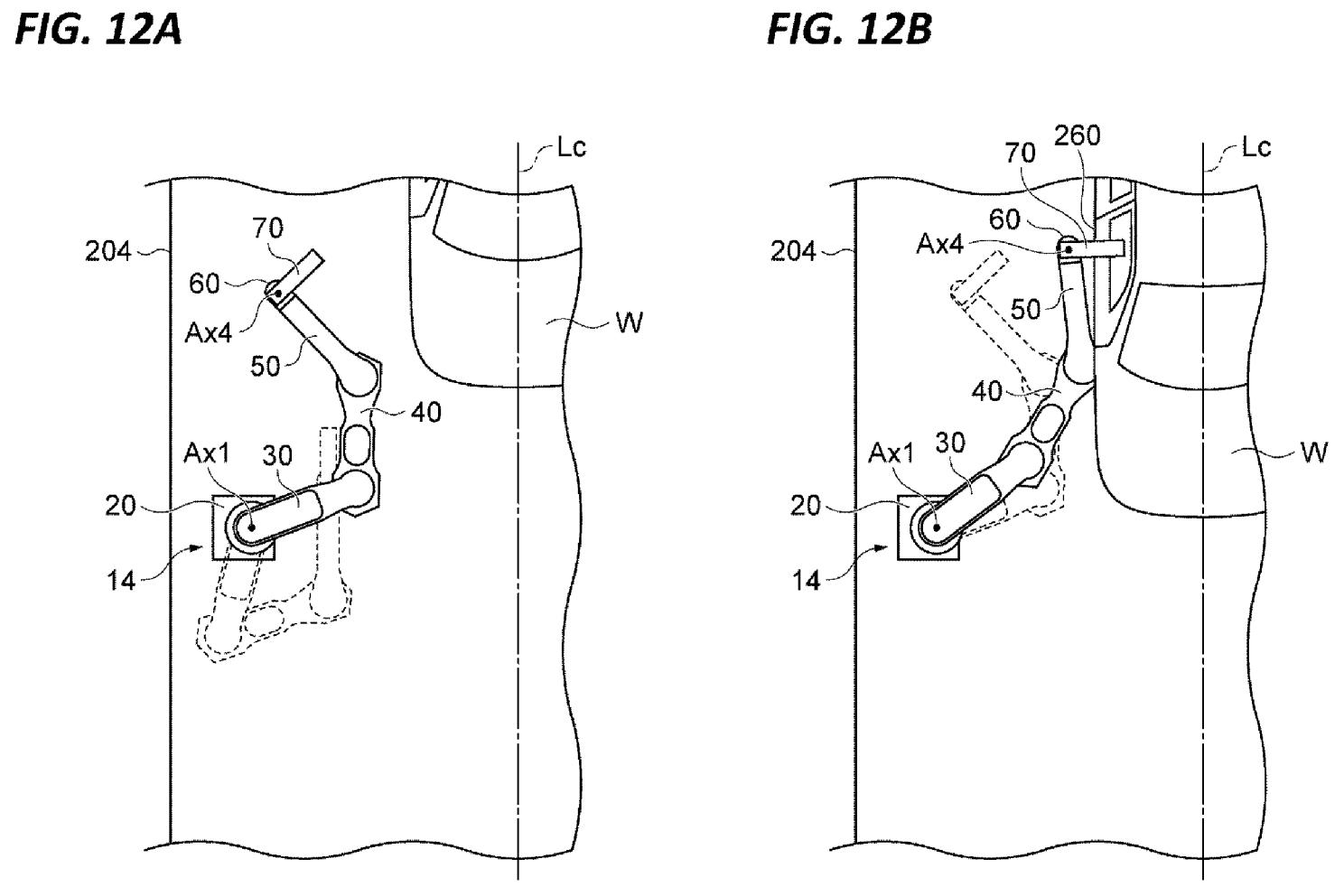

Next, the control device 16 executes step S02. In step S02, for example, the door opening control unit 104 of the control device 16 controls the door opening/closing robot 14 to perform the door opening control. For example, the door opening control is performed as follows. As illustrated in FIG. 12A, the door opening control unit 104 first controls the door opening/closing robot 14 such that each arm at the standby position in the initial state is arranged at a preparation position for the door opening control.

At the preparation position for the door opening control, the first arm 30, the second arm 40, and the third arm 50 may be arranged to face (e.g., be directed toward) an upstream side on the conveyance line Lc. Hereinafter, the state where the first arm 30, the second arm 40, and the third arm 50 face an upstream side on the conveyance line Lc is defined as a "state A." The state where each arm faces an upstream side on the conveyance line Lc indicates that a component of the arm on the conveyance line Lc in the direction (orientation) from the proximal end toward the distal end of the arm faces an upstream side. Thus, even though the arm is inclined to the conveyance line Lc when viewed in the vertical direction, the arm is in the state of facing an upstream side as long as the component on the conveyance line Lc faces an upstream side. The state where each arm faces a downstream side on the conveyance line Lc indicates that a component of the arm on the conveyance line Lc in the direction (orientation) from the proximal end toward the distal end of the arm faces a downstream side.

In accordance with the arrangement of the arms at the preparation position, the door opening control unit 104 moves up the tool 70 to the height position at which the holding part 74 of the tool 70 may pass through the window frame 262 of the door 260, by the fourth arm 60 provided with the lifting device 97. Then, as illustrated in FIG. 12B, the control device 16 controls the door opening/closing robot 14 to rotate the first arm 30 from the preparation position toward the upstream side, and move the second arm 40 and the third arm 50 close to the vehicle body 250, thereby inserting the holding part 74 of the tool 70 into the vehicle body 250.

After the holding part 74 enters the vehicle body 250, the door opening control unit 104 changes the position of the tool 70 by the door opening/closing robot 14, such that the tool 70 moves down by the fourth arm 60 provided with the lifting device 97, and the holding part 74 comes into contact with (e.g., holds) the door 260. At the time point when the holding part 74 first comes into contact with the door 260, the contact point (e.g., the holding point) is positioned at an upstream side of the rotation axis Ax1. When the holding part 74 of the tool 70 passes through the window frame 262 and comes into contact with the closed door 260, at least a portion of the third arm 50 (e.g., a portion of the connection section CS) may be positioned and operate below the vehicle body 250.

Figures 13A, 13B:
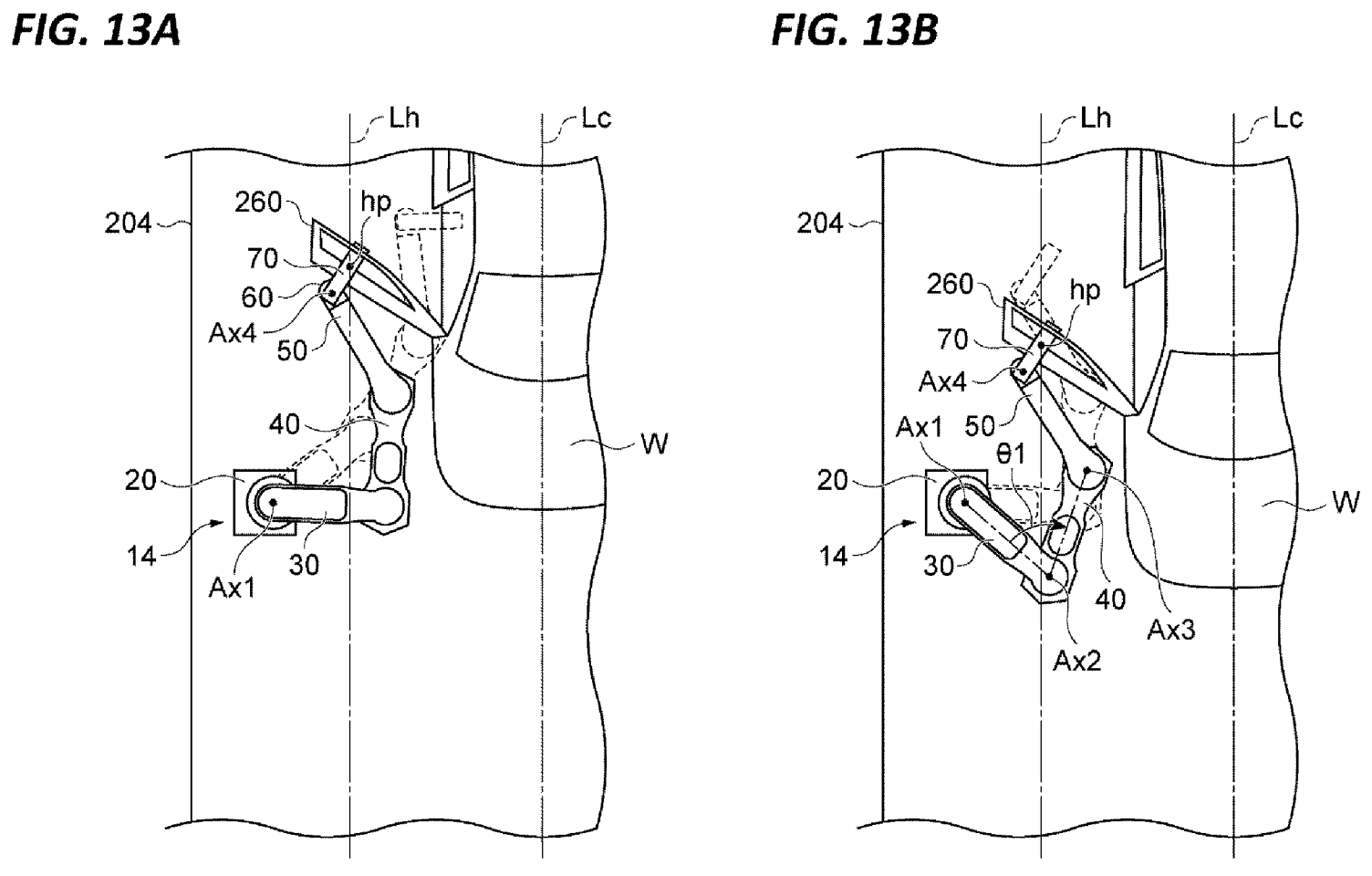

After the tool 70 holds the door 260, the door opening control unit 104 controls the door opening/closing robot 14 such that the tool 70 pulls and opens the door 260 as illustrated in FIG. 13A. The door opening control unit 104 may control the door opening/closing robot 14 to open the door 260 to the position substantially matching the maximum openable position. Hereinafter, the position of the door 260 opened by the door opening control will be referred to as an "opened position." When moving the door 260 to the opened position, the door opening control unit 104 may control the door opening/closing robot 14 to rotate the first arm 30 around the rotation axis Ax1 toward the downstream side.

The door opening control unit 104 may control the door opening/closing robot 14 to make the first arm 30 face a downstream side after moving the door 260 to the opened position. The state where the first arm 30 faces a downstream side on the conveyance line Lc, and the second arm 40 and the third arm 50 face an upstream side on the conveyance line Lc is defined as a "state B." After the shift to the state A, the first arm 30 rotates around the rotation axis Ax1 to face a downstream side, so that the operation state of the plurality of arms shifts from the state A to the state B. The door opening control unit 104 may control the door opening/ closing robot 14 such that the operation state shifts from the state A to the state B during the door opening control.

When the door 260 moves to the opened position, the door opening control ends. The operation state of the plurality of arms may be the state B at the time when the door opening control ends. Unlike the embodiment described above, the door opening control unit 104 may control the door opening/closing robot 14 to maintain the state A during the door opening control. The door opening control unit 104 may control the door opening/closing robot 14 to move the door 260 to the opened position after the shift to the state A and before the shift to the state B. The operation state of the plurality of arms may be the state A at the time when door opening control ends.

As described above, in the door opening control, the control device 16 may control the door opening/closing robot 14 such that when the tool 70 holds the closed door 260, at least a portion of the third arm 50 is positioned below the vehicle body 250. In the door opening control, the control device 16 may control the door opening/closing robot 14 such that when the tool 70 holds the closed door 260, at least a portion of the second arm 40 and at least a portion of the third arm 50 are positioned below the vehicle body 250.

After executing step S02, the control device 16 executes step S03. In step S03, for example, the door following control unit 106 of the control device 16 controls the door opening/closing robot 14 to perform the door following control. For example, the door following control is performed as follows. After the door opening control ends, the door following control unit 106 controls the door opening/closing robot 14 to rotate the first arm 30 around the rotation axis Ax1 toward the downstream side and maintain the opened state of the door 260, while following the movement of the vehicle body 250, as illustrated in FIGS. 13B and 14A.

The door following control unit 106 may control the door opening/closing robot 14 such that the first arm 30 stops after rotating around the rotation axis Ax1 from the rotation start position at the ending time of the door opening control to the predetermined set position, while maintaining the opened state of the door 260. The door following control unit 106 may control the door opening/closing robot 14 such that the first arm 30 stops after rotating around the rotation axis Ax1 from the rotation start position to the set position, before the door following control.

The door following control unit 106 may control the door opening/closing robot 14 such that the change amount of the rotation angle of the first arm 30 per unit time is substantially constant, when the first arm 30 rotates from the rotation start position to the set position. When the door opening control ends in the state A, the operation state of the plurality of arms may shift from the state A to the state B during the rotation of the first arm 30 to the set position.

Figures 14A, 14B:
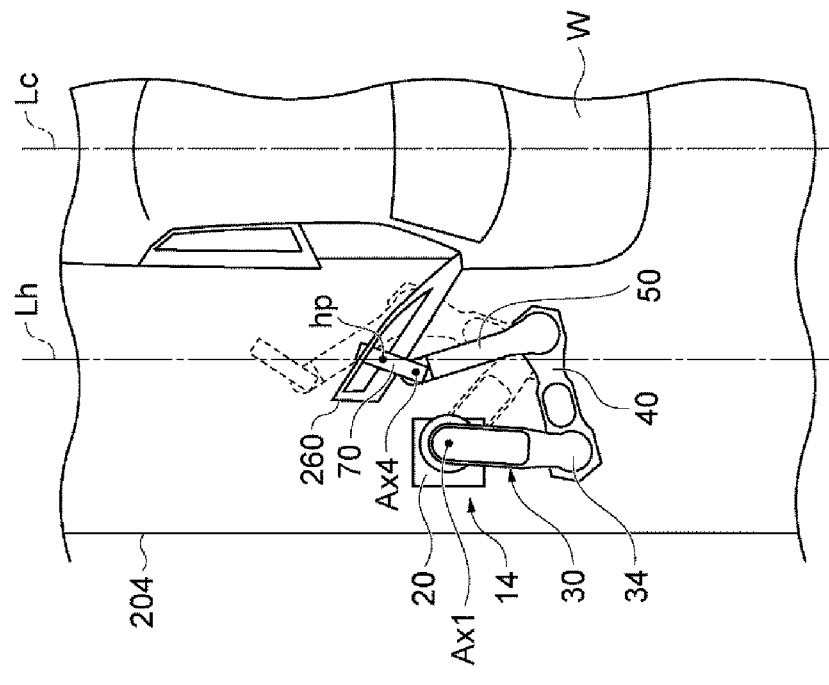
FIGS. 14A and 14B are schematic views illustrating an embodiment of the operation of the door opening/closing robot.

FIG. 14A illustrates a state where the first arm 30 stops at the set position. The set position at which the first arm 30 stops is set such that the distal end 34 of the first arm 30 does not come into contact with the booth side wall 204 when the first arm 30 stops. The set position may be set such that at least a portion of the distal end 34 of the first arm 30 overlaps with the base 20 when the base 20 is viewed from the direction along the conveyance line Lc (e.g., the X-axis direction) at the time when the first arm 30 stops. In this case, when the first arm 30 stops at the set position, at least a portion of the proximal end 32 is at the same position as at least a portion of the base 20 in the Y-axis direction.

The door following control unit 106 may control the door opening/closing robot 14 such that the first arm 30 stops at the set position while the plurality of arms are maintained in the state B. The door following control unit 106 may control the door opening/closing robot 14 to stop the first arm 30 at the set position before the front end of the door 260 held by the tool 70 reaches the base 20 in the X-axis direction along the conveyance line Lc. In this case, the first arm 30 stops at the set position when the front end of the door 260 held by the tool 70 is positioned at an upstream side of the base 20 on the conveyance line Lc.

After the shift to the state B, the door following control unit 106 may control the door opening/closing robot 14 such that the angle θ1 of the second arm 40 with respect to the first arm 30 is maintained to be less than 90° while the first arm 30 rotates to the set position. In the vertical direction, assuming that a virtual line segment connecting the rotation axes Ax1 and Ax2 is defined as 0° (e.g., as a reference angle), and one rotation direction around the rotation axis Ax2 (e.g., the clockwise direction in FIG. 13B) is defined as being positive, the angle θ1 is an angle of a virtual line segment connecting the rotation axes Ax2 and Ax3.

Figures 15A, 15B:
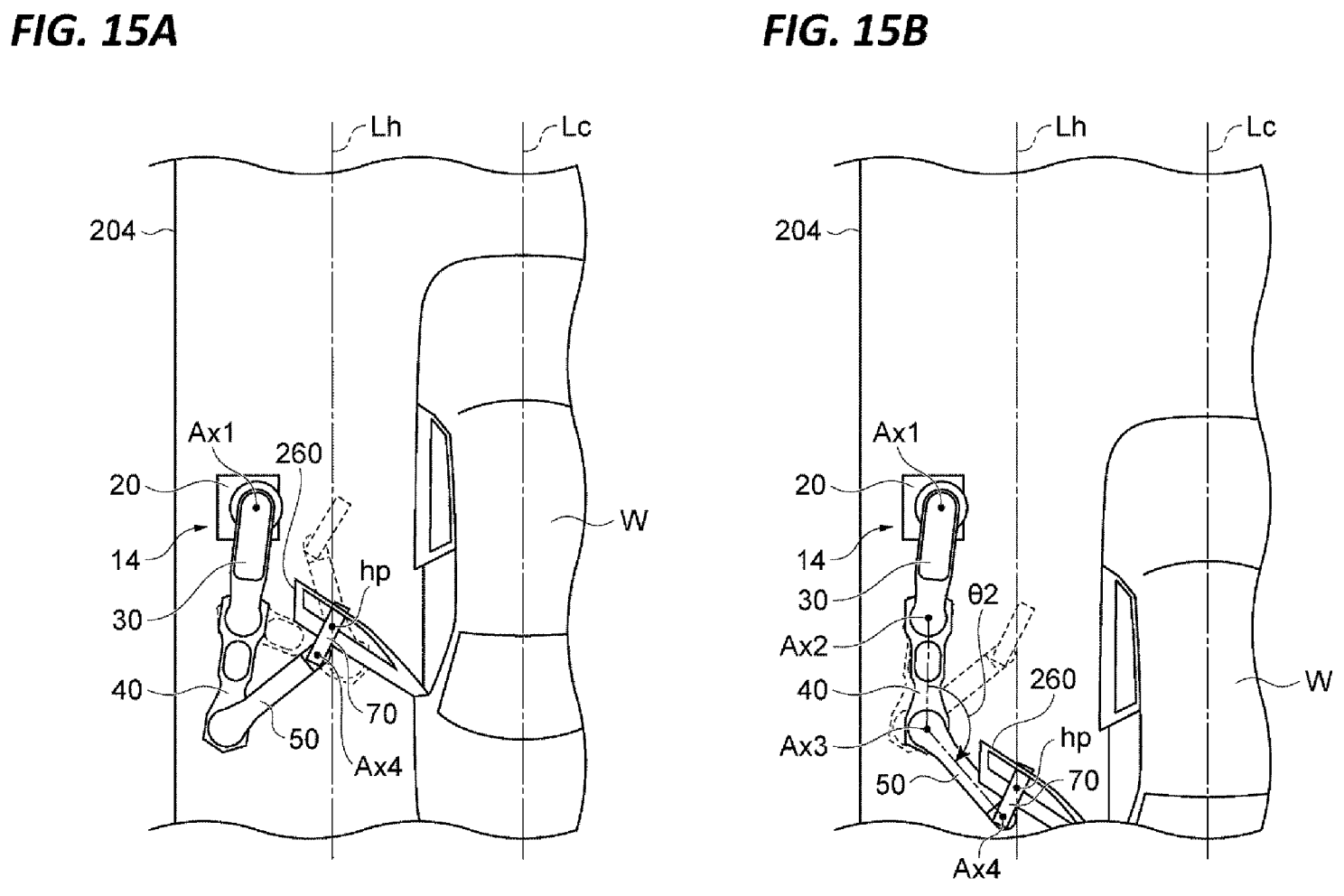

After the first arm 30 stops at the set position, the door following control unit 106 controls the door opening/closing robot 14 to rotate the second arm 40 around the rotation axis Ax2 toward the downstream side, and maintain the opened state of the door 260 while following the movement of the vehicle body 250, as illustrated in FIGS. 14B and 15A. In the door following control, the door following control unit 106 may control the door opening/closing robot 14 such that the first arm 30 stays at the set position after stopping at the set position.

As illustrated in FIG. 14B, with the rotation of the second arm 40 around the rotation axis Ax2, the second arm 40 shifts to the state of facing a downstream side, while the third arm 50 faces an upstream side. The state where the first arm 30 and the second arm 40 face a downstream side on the conveyance line Lc, and the third arm 50 faces an upstream side on the conveyance line Lc is defined as a "state C." After stopping the first arm 30 at the set position, the door following control unit 106 may control the door opening/closing robot 14 such that the operation state of the plurality of arms shifts from the state B to the state C.

After the shift to the state C, the door following control unit 106 may control the door opening/closing robot 14 such that the front end of the door 260 held by the tool 70 passes the base 20. In this case, the state C is maintained during a time period when the position of the front end of the door 260 reaches one end of the base 30 on the upstream side in the direction along the conveyance line Lc, and then, reaches the other end of the base 20 on the downstream side in the same direction.

After the shift to the state C, the door following control unit 106 may control the door opening/closing robot 14 such that the angle θ2 of the third arm 50 with respect to the second arm 40 is maintained to be less than 90° while the front end of the door 260 held by the tool 70 passes the base 20. In the vertical direction, assuming that a virtual line segment connecting the rotation axes Ax2 and Ax3 is defined as 0° (e.g., a reference angle), and one rotation direction around the rotation axis Ax3 (e.g., the clockwise direction in FIG. 14B) is defined as being positive, the angle θ2 is an angle of a virtual line segment connecting the rotation axes Ax3 and Ax4.

FIG. 15A illustrates a state where the second arm 40 rotates around the rotation axis Ax2 to a position where the distal end 44 of the second arm 40 overlaps with the base 20 in the Y-axis direction, after the shift to the state C. After the shift to the state C, the door following control unit 106 may control the door opening/closing robot 14 to rotate the second arm 40 until the virtual line segment connecting the rotation axes Ax1, Ax2, and Ax3 becomes substantially straight.

After the second arm 40 rotates until the virtual line segment becomes substantially straight, the door following control unit 106 may control the door opening/closing robot 14 to rotate the third arm 50 around the rotation axis Ax3 toward the downstream side, and maintain the opened state of the door 260 while following the movement of the vehicle body 250. The door following control unit 106 may control the door opening/closing robot 14 such that the first arm 30 stays at the set position, and the rotation angle of the second arm 40 changes, while the third arm 50 rotates toward the downstream side.

As the third arm 50 rotates around the rotation axis Ax3, the third arm 50 shifts to the state of facing a downstream side while the first arm 30 and the second arm 40 face a downstream side. Hereinafter, the state where the first arm 30, the second arm 40, and the third arm 50 face a downstream side on the conveyance line Lc is defined as a "state D." The door following control unit 106 may control the door opening/closing robot 14 to shift from the state C to the state D during the door following control.

The door following control unit 106 may control the door opening/closing robot 14 to maintain the opened state of the door 260 until reaching a predetermined following end position at a downstream side of the base 20 on the conveyance line Lc. After the shift to the state D, the door following control unit 106 may control the door opening/closing robot 14 to end the door following control without causing any further shift of the operation state of the plurality of arms. The door following control unit 106 may control the door opening/closing robot 14 to shift from the state B to the state C and shift from the state C to the state D, during the door following control. After the shift to the state D, the door following control unit 106 may control the door opening/closing robot 14 to maintain the state where the angle θ2 of the third arm 50 with respect to the second arm 40 is less than 180° during the door following control.

In the door following control, the door following control unit 106 may control the door opening/closing robot 14 such that the point where the tool 70 holds the door 260 (hereinafter, referred to as a "holding point hp") moves on a holding line Lh parallel to the conveyance line Lc. The holding point hp is, for example, a point at which the holding part 74 of the tool 70 is in contact with the inner surface 264 of the door 260 when viewed in the vertical direction. As illustrated in FIGS. 13A to 15B, the door following control unit 106 may control the door opening/closing robot 14 such that the movement trajectory of the holding point hp during the door following control becomes parallel to the conveyance line Lc.

In an embodiment, during the door following control, the door following control unit 106 controls the door opening/closing robot 14 such that the holding point hp where the tool 70 holds the door 260 moves on the holding line Lh, while maintaining the relative position and posture of the tool 70 (or the fourth arm 60) with respect to the opened door 260. During the door following control, the door following control unit 106 may control the door opening/closing robot 14 such that a virtual line segment connecting the point where the tool 70 comes into contact with the door 260 (e.g., the holding point hp) and the rotation axis Ax4 maintains a predetermined angle with respect to the door 260 when viewed in the vertical direction.

Figures 16A, 16B:
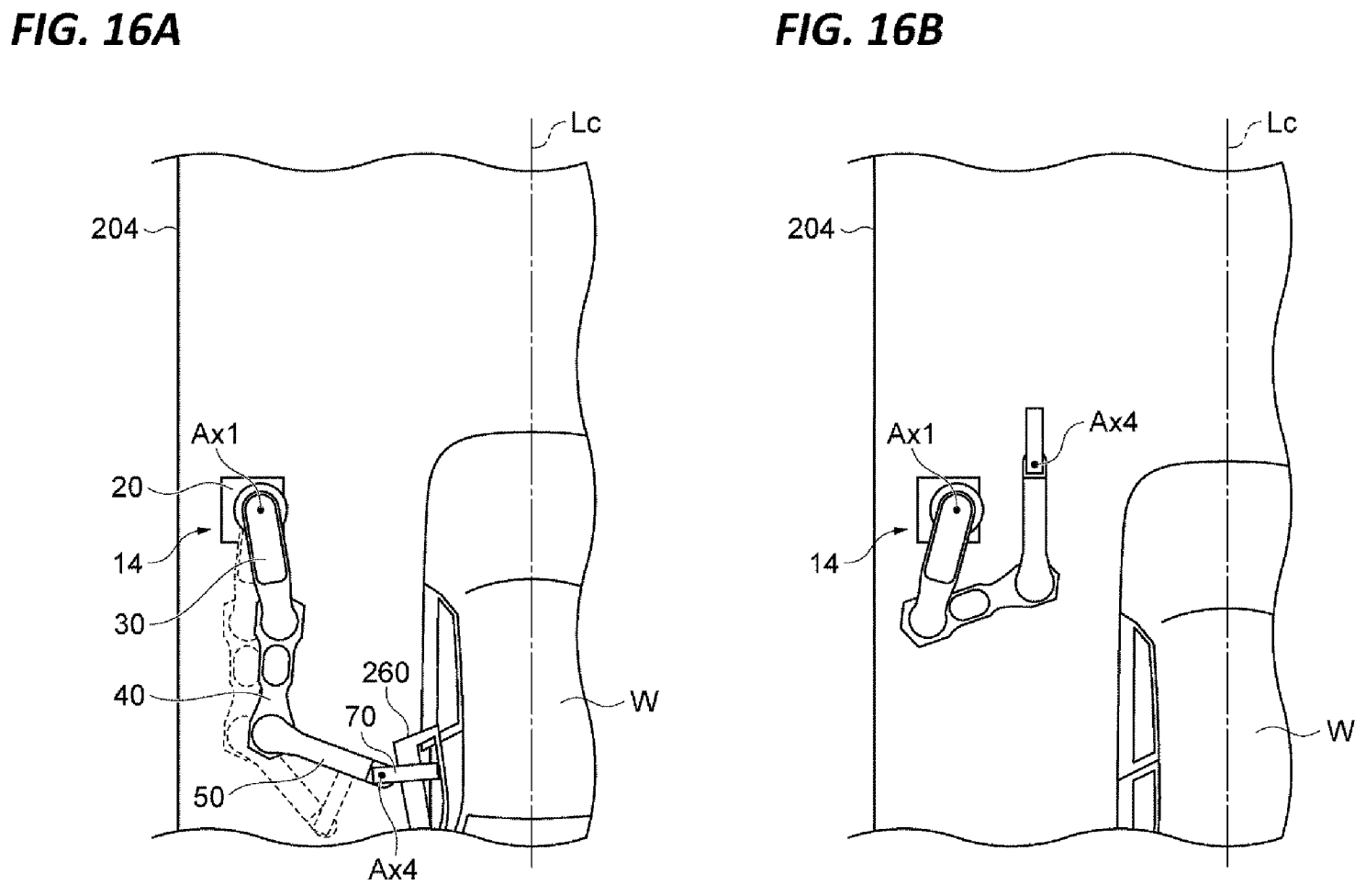

After executing step S03, the control device 16 executes step S04. In step S04, for example, the door closing control unit 108 of the control device 16 controls the door opening/closing robot 14 to perform the door closing control. For example, the door closing control is performed as follows. As illustrated in FIG. 16A, for example, the door closing control unit 108 controls the door opening/closing robot 14 such that the tool 70 pulls the door 260 to bring the door 260 closer to the vehicle body 250, while maintaining the state where the tool 70 holds the door 260 (e.g., the state where the tool 70 magnetically adsorbs the door 260). At the time point when the operation of closing the door 260 is started, the point where the holding part 74 of the tool 70 is in contact with the door 260 (e.g., the holding point) is positioned at a downstream side of the rotation axis Ax1.

The door closing control unit 108 may cause the door opening/closing robot 14 to move the door 260 from the opened position to a closed position while rotating the third arm 50 around the rotation axis Ax3 toward the further upstream side as compared with the time when the door following control ends. After the door 260 is closed, the door closing control unit 108 moves up the tool 70 by the fourth arm 60 to the height position at which the holding part 74 of the tool 70 may pass through the window frame 262 of the door 260. Then, the door closing control unit 108 controls the door opening/closing robot 14 such that the second arm 40 and the third arm 50 retreat from the vehicle body 250, and the holding part 74 of the tool 70 passes through the window frame 262. Then, the holding part 74 of the tool 70 is brought out of the vehicle body 250. When the holding part 74 comes out of the vehicle body 250, the door closing control ends.

After the door closing control ends, the control device 16 may perform a control to arrange each arm at the standby position before the execution of step S02 as illustrated in FIG. 16B. While each arm is moved to the standby position, the control device 16 may move down the tool 70 by the fourth arm 60 provided with the lifting device 97 to a height position at which the holding part 74 may not pass through the window frame 262. In this way, the series of controls included in the opening/closing control for one door 260 ends.

During the time period of performing the door opening control, the door following control, and the door closing control, the second arm 40 may operate at a position lower than the lower end of the door 260 of the vehicle body 250 (e.g., a low height range) that is being conveyed along the conveyance line Lc. During the time period of performing the door opening control, the door following control, and the door closing control, the second arm 40 and the third arm 50 may operate at a position lower than the lower end of the door 260 of the vehicle body 250 (e.g., a low height range) that is being conveyed along the conveyance line Lc.

During the time period of performing the door opening control, the door following control, and the door closing control, the control device 16 may control the door opening/closing robot 14 to maintain the state where the angle θ2 of the third arm 50 with respect to the second arm 40 is less than 180°.

Figure 17:
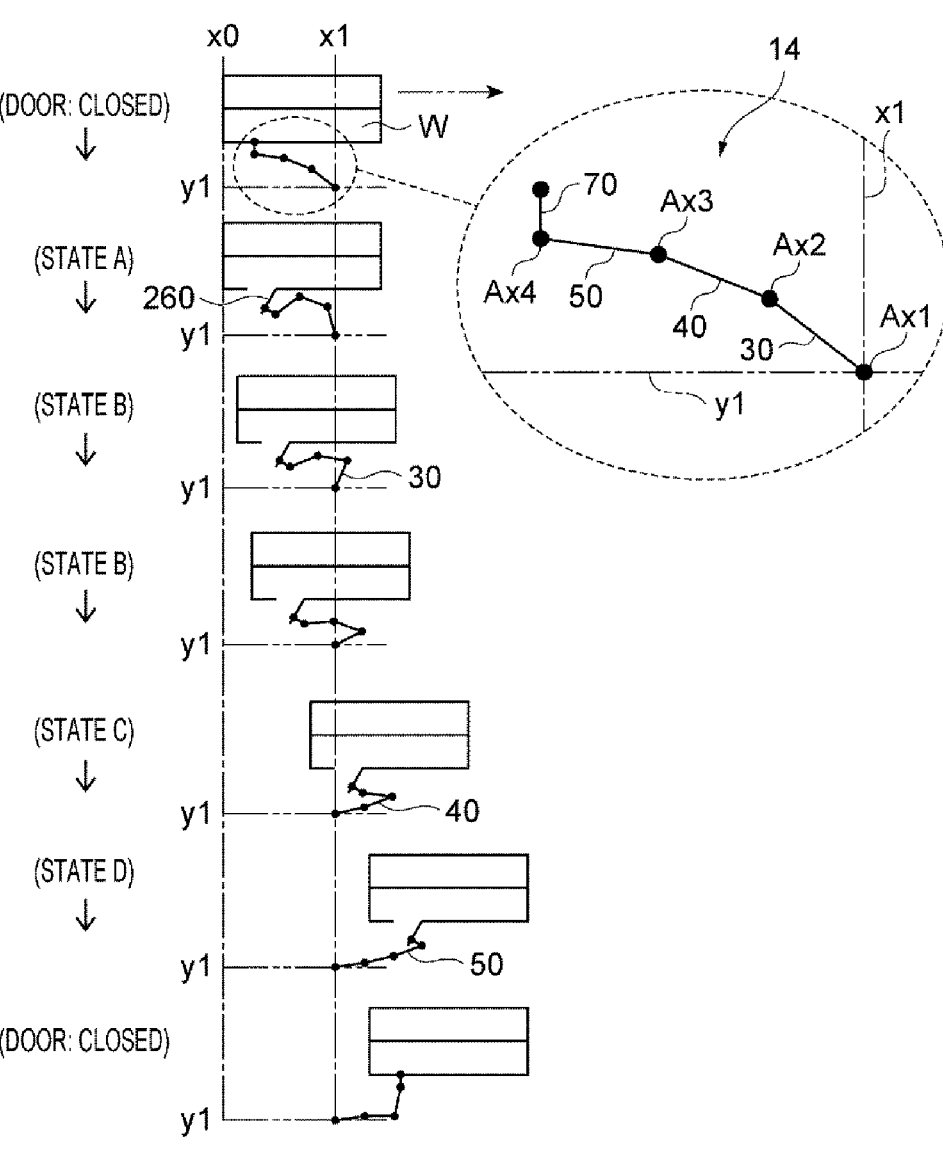
FIG. 17 is a schematic view illustrating an embodiment of a series of operations performed by the door opening/closing robot.

FIG. 17 schematically illustrates the shift of the operation state of the plurality of arms during the opening/closing control including the door opening control, the door following control, and the door closing control. FIG. 17 illustrates seven operation states for the plurality of arms, which shift from top to bottom on the page of FIG. 17. The workpiece W (e.g., the vehicle body 250) is conveyed from left to right on the page of FIG. 17. The "x0" represents the position of the rear end of the vehicle body 250 in the X-axis direction along the conveyance line Lc when the opening/closing control starts. The "x1" and "y1" represent the installation position of the base 20 (e.g., the position of the rotation axis Ax1). The "x1" is the position in the X-axis direction along the conveyance line Lc, and "y1" is the position in the Y-axis direction orthogonal to the conveyance line Lc.

As illustrated in the enlarged view of FIG. 17, the line extending from the rotation axis Ax1 located at x1, y1 to the next point (e.g., the rotation axis Ax2) represents the first arm 30, and the line extending from the rotation axis Ax2 to the next point (e.g., the rotation axis Ax3) represents the second arm 40. The line extending from the rotation axis Ax3 to the next point (e.g., the rotation axis Ax4) represents the third arm 50, and the line extending from the rotation axis Ax4 to the next point represents the tool 70. FIG. 17 omits the fourth arm 60 which is formed to extend vertically.

As illustrated in FIG. 17, the control device 16 starts the door opening control after the shift to the state A where the first arm 30, the second arm 40, and the third arm 50 face an upstream side on the conveyance line Lc. After the shift to the state A, the control device 16 controls the door opening/closing robot 14 such that the first arm 30 rotates to face a downstream side earlier than the other arms. As a result, during the door opening control or the door following control, the state A shifts to the state B where the first arm 30 faces a downstream side on the conveyance line Lc, and the second arm 40 and the third arm 50 face an upstream side on the conveyance line Lc.

After the shift to the state B, the control device 16 controls the door opening/closing robot 14 such that the second arm 40 rotates to face a downstream side earlier than the third arm 50. As a result, during the door following control, the state B shifts to the state C where the first arm 30 and the second arm 40 face a downstream side on the conveyance line Lc, and the third arm 50 faces an upstream side on the conveyance line Lc. After the shift to the state C, the control device 16 controls the door opening/closing robot 14 such that the third arm 50 rotates to finally face a downstream side. As a result, the state C shifts to the state D during the door following control.

After the shift to the state D, the control device 16 ends the door following control without causing any further shift of the operation state of the plurality of arms, and performs the door closing control. For the convenience of description, the operations illustrated in FIG. 17 will be referred to as an "operation pattern 1." In the operation pattern 1, the control device 16 controls the door opening/closing robot 14 such that the operation state sequentially shifts to the state A, the state B, the state C, and the state D during the time period of performing the door opening control and the door following control.

Figure 18:
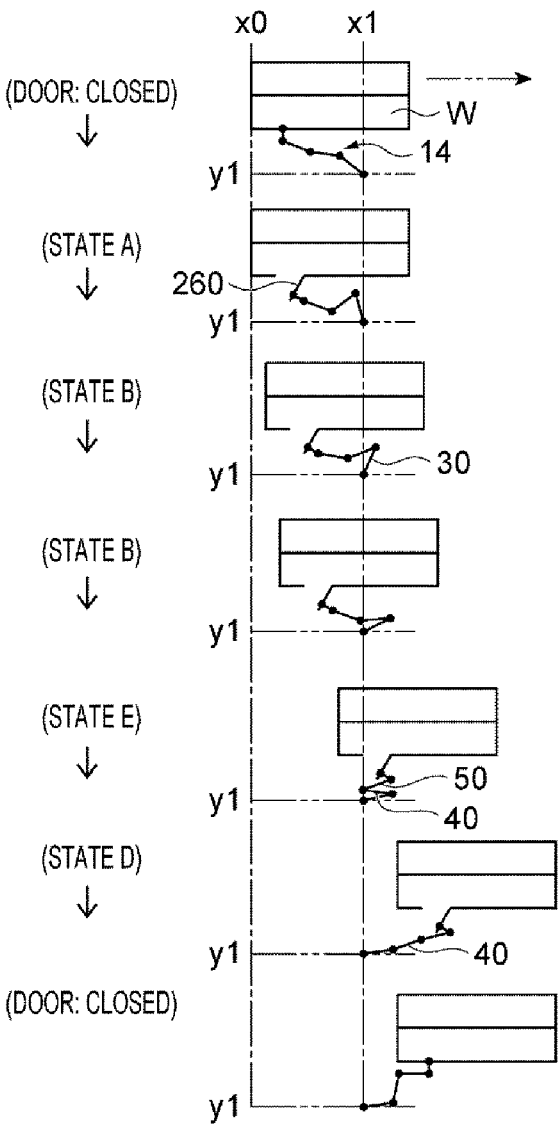
FIG. 18 is a schematic view illustrating an embodiment of a series of operations performed by the door opening/closing robot.

The control device 16 may perform the opening/closing control by operations different from the operation pattern 1. FIG. 18 schematically illustrates the shift of the operation state of the plurality of arms in an "operation pattern 2" different from the operation pattern 1. Similar to FIG. 17, FIG. 18 illustrates seven operation states for the plurality of arms. FIG. 18 represents the shift of the operation state in the same manner as that in FIG. 17.

Similar to the operation pattern 1, the state A shifts to the state B during the door opening control or the door following control in the operation pattern 2. After the shift to the state B, the control device 16 controls the door opening/closing robot 14 such that the third arm 50 rotates to face a downstream side earlier than the second arm 40. As a result, during the door following control, the state B shifts to a state where the first arm 30 and the second arm 50 face a downstream side on the conveyance line Lc, and the second arm 40 faces an upstream side on the conveyance line Lc. The state where the first arm 30 and the third arm 50 face a downstream side on the conveyance line Lc, and the second arm 40 faces an upstream side on the conveyance line Lc is defined as a "state E."

After the shift to the state E, the control device 16 controls the door opening/closing robot 14 such that the second arm 40 rotates to finally face a downstream side. As a result, the state E shifts to the state D during the door following control. In the operation pattern 2, the control device 16 controls the door opening/closing robot 14 such that the operation state sequentially shifts to the state A, the state B, the state E, and the state D during the time period of performing the door opening control and the door following control.

Figure 19:
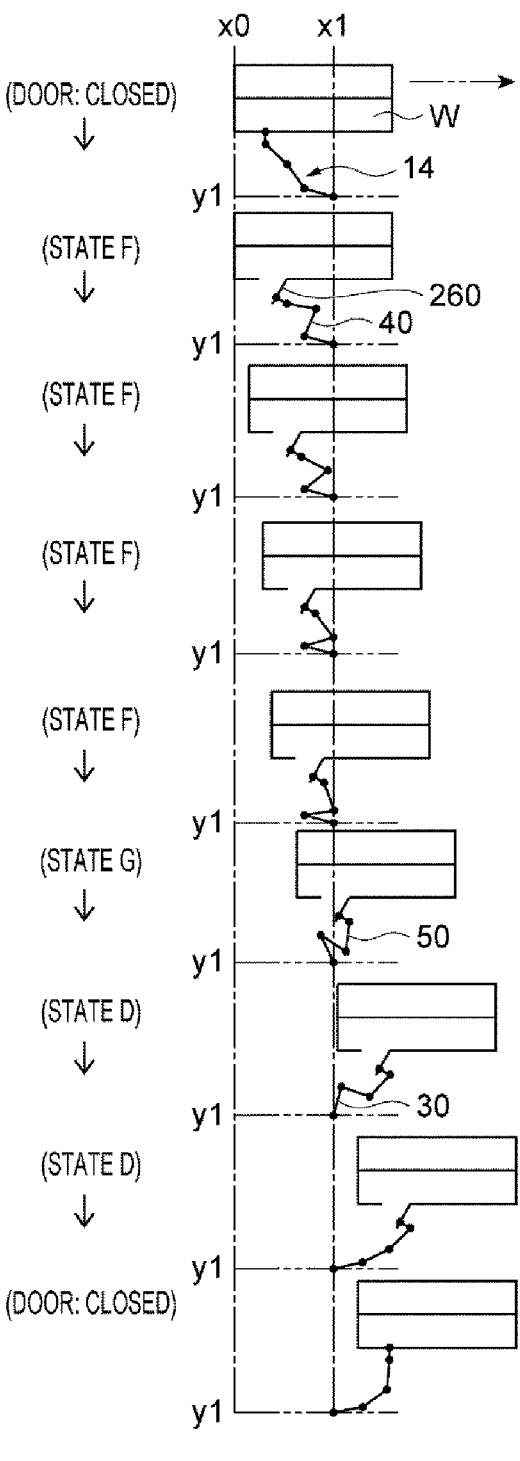
FIG. 19 is a schematic view illustrating an embodiment of a series of operations performed by the door opening/closing robot.

FIG. 19 schematically illustrates the shift of the operation state of the plurality of arms in an "operation pattern 3" different from the operation patterns 1 and 2. FIG. 19 illustrates nine operation states for the plurality of arms. FIG. 19 represents the shift of the operation state in the same manner as that in FIG. 17.

After the shift to the state A, the control device 16 controls the door opening/closing robot 14 such that the second arm 40 rotates to face a downstream side earlier than the other arms. As a result, during the door opening control or the door following control, the state A shifts to a state where the second arm 40 faces a downstream side on the conveyance line Lc, and the first arm 30 and the third arm 50 face an upstream side on the conveyance line Lc. The state where the second arm 40 faces a downstream side on the conveyance line Lc, and the first arm 30 and the third arm 50 face an upstream side on the conveyance line Lc is defined as a "state F."

After the shift to the state F, the control device 16 controls the door opening/closing robot 14 such that the third arm 50 rotates to face a downstream side earlier than the first arm 30. As a result, during the door following control, the state F shifts to a state where the second arm 40 and the third arm 50 face a downstream side on the conveyance line Lc, and the first arm 30 faces an upstream side on the conveyance line Lc. The state where the second arm 40 and the third arm 50 face a downstream side on the conveyance line Lc, and the first arm 30 faces an upstream side on the conveyance line Lc is defined as a "state G."

After the shift to the state G, the control device 16 controls the door opening/closing robot 14 such that the first arm 30 rotates to finally face a downstream side. As a result, the state G shifts to the state D during the door following control. In the operation pattern 3, the control device 16 controls the door opening/closing robot 14 such that the operation state sequentially shifts to the state A, the state F, the state G, and the state D during the time period of performing the door opening control and the door following control. Each of the operation patterns 1 to 3 is an embodiment of the operations of the plurality of arms, and the control device 16 may control the door opening/closing robot 14 to operate in an operation pattern different from the operation patterns 1 to 3.

Figure 20:
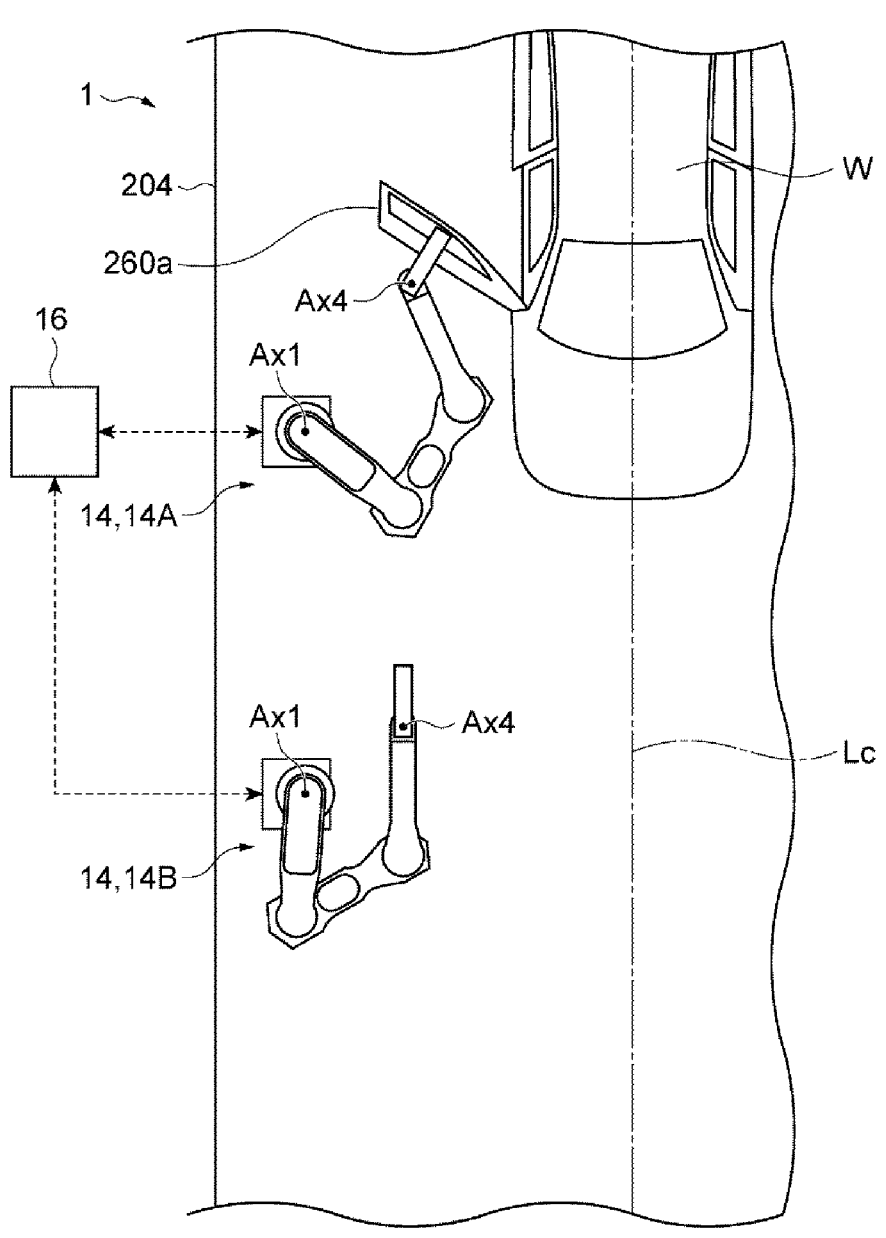
FIG. 20 is a schematic view illustrating an embodiment of a painting system provided with two door opening/closing robots.

As illustrated in FIG. 20, the painting system 1 may include two door opening/closing robots 14 arranged along the conveyance line Lc. The two door opening/closing robots 14 are disposed between the conveyance line Lc and the booth side wall 204. Hereinafter, one of the two door opening/closing robots 14 will be referred to as a "door opening/closing robot 14A," and the door opening/closing robot 14 disposed at a downstream side of the door opening/closing robot 14A will be referred to as a "door opening/closing robot 14B."

The control device 16 controls the door opening/closing robot 14A and the door opening/closing robot 14B (e.g., a second door opening/closing robot). The control device 16 may include two controllers (e.g., computer devices) that control the door opening/closing robots 14A and 14B, respectively. The two controllers may be connected to each other for a communication. Each controller may include the circuitry 120 illustrated in FIG. 10. The control device 16 may be a control system configured with multiple controllers.

The control device 16 performs an opening/closing control (e.g., a first control) in which the door opening/closing robot 14A sequentially performs the door opening control, the door following control, and the door closing control for one door 260. The controller 16 performs an opening/closing control (e.g., a second control) in which the door opening/closing robot 14B sequentially performs the door opening control, the door following control, and the door closing control for the door 260 opened/closed by the door opening/closing robot 14A. The robot device 18 may include the door opening/closing robots 14A and 14B and the control device 16.

Here, the door 260 positioned at the forward side on one side of the vehicle body 250 will be referred to as a "front door 260a," and the door 260 attached to the rearward side of the front door 260a of the vehicle body 250 will be referred to as the a "rear door 260b." The control device 16 may sequentially perform the opening/closing control for each of the front door 260a and the rear door 260b using the door opening/closing robot 14A. The control device 16 may sequentially perform the opening/closing control for each of the front door 260a and the rear door 260b using the door opening/closing robot 14B.

Figure 21:
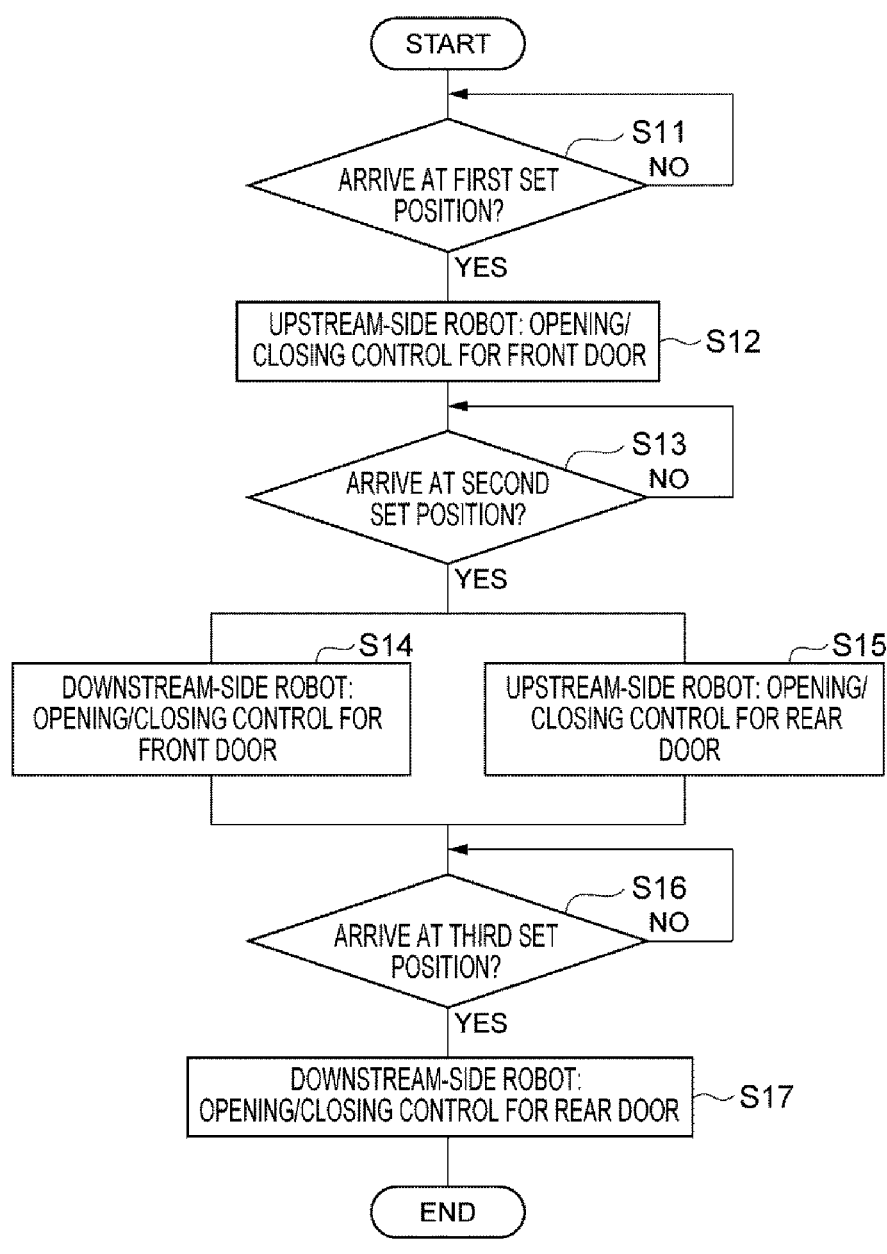
FIG. 21 is a flowchart illustrating an embodiment of a series of processes executed by the control device.

FIG. 21 is a flowchart illustrating the series of processes performed by the control device 16 when the two door opening/closing robots 14 perform the opening/closing control for each of the front door 260a and the rear door 260b. In the series of processes, the control device 16 executes step S11 in a state where the front door 260a of the vehicle body 250 of the work target is positioned at an upstream side of the base 20 on the conveyance line Lc. In step S11, for example, the control device 16 waits until the vehicle body 250 of the work target arrives at a predetermined first set position on the conveyance line Lc, as in step S01 described above.

Next, the control device 16 executes step S12. In step S12, for example, the control device 16 performs the opening/closing control (e.g., the first control) for the front door 260a using the door opening/closing robot 14A. The control device 16 may perform the opening/closing control for the front door 260a in the same manner as that in steps S02 to S04 described above. After the operation state of the plurality of arms shifts to the state A, the control device 16 may control the door opening/closing robot 14A to start the door opening control for the front door 260a, and cause the operation state to sequentially shift to the state A, the state B, and the state C. After the shift to the state C, the control device 16 may control the door opening/closing robot 14A to end the door following control without causing any further shift of the operation state of the plurality of arms. FIG. 20 illustrates a state where the door opening/closing robot 14B is waiting, and the door opening/closing robot 14A is performing the opening/closing control for the front door 260a.

Next, the control device 16 executes step S13. In step S13, for example, the control device 16 waits until the vehicle body 250 of the work target arrives at a predetermined second set position on the conveyance line Lc. The second set position is set to a position at a downstream side of the first set position used in step S11.

Next, the control device 16 executes step S14. In step S14, for example, the control device 16 performs the opening/closing control (e.g., the second control) for the front door 260a using the door opening/closing robot 14B. The control device 16 may perform the opening/closing control for the front door 260a in the same manner as that in steps S02 to S04 described above. As in step S12, after the shift to the state A, the control device 16 may start the door opening control for the front door 260a, cause the operation state to sequentially shift to the state A, the state B, and the state C, and then, end the door following control for the front door 260a without causing any further shift.

The control device 16 executes step S15 during a time period overlapping with at least part of the time period of executing step S14 (e.g., the second control). In step S15, for example, the control device 16 performs an opening/closing control (e.g., a third control) for the rear door 260b (e.g., the second door) using the door opening/closing robot 14A. The control device 16 may perform the opening/closing control for the rear door 260b in the same manner as that in steps S02 to S04 described above. Unlike step S12, after the shift to the state B, the control device 16 may start the door opening control, and cause the operation state to sequentially shift to the state B, the state C, and the state D. After the shift to the state D, the control device 16 may end the door following control.

Figure 22:
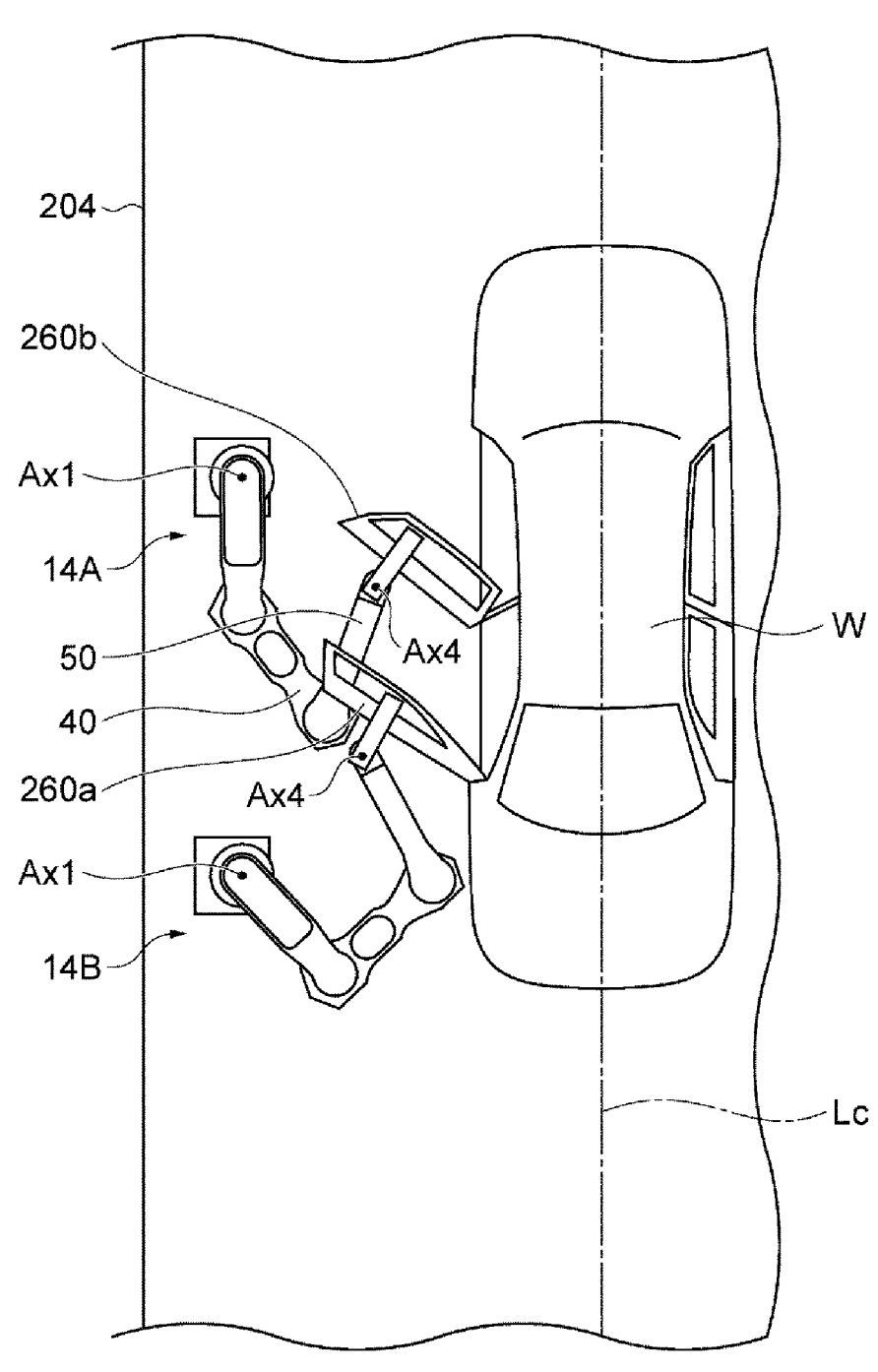
FIG. 22 is a schematic view illustrating an embodiment of an operation of the door opening/closing robot.

FIG. 22 illustrates a state where the door opening/closing robot 14A is performing the opening/closing control for the rear door 260b, and the door opening/closing robot 14B is performing the opening/closing control for the front door 260a. As illustrated in FIG. 22, during at least part of the time period of executing step S15 (e.g., the third control), the second arm 40 and the third arm 50 of the door opening/closing robot 14A that are opening the rear door 260b may operate below the front door 260a opened by the door opening/closing robot 14B. During the above-described part of the time period, the second arm 40 and the third arm 50 of the door opening/closing robot 14A may operate in a state where at least a portion of the second arm 40 and the third arm 50 is positioned vertically below the front door 260a. During at least part of the time period of executing step S15, at least a portion of the front door 260a may overlap with at least a portion of the second arm 40 and the third arm 50 of the door opening/closing robot 14A, when viewed in the vertical direction.

Next, the control device 16 executes step S16. In step S16, for example, the control device 16 waits until the vehicle body 250 of the work target arrives at a predetermined third set position on the conveyance line Lc. The third set position is set to a position at a downstream side of the second set position used in step S13.

Figure 23:
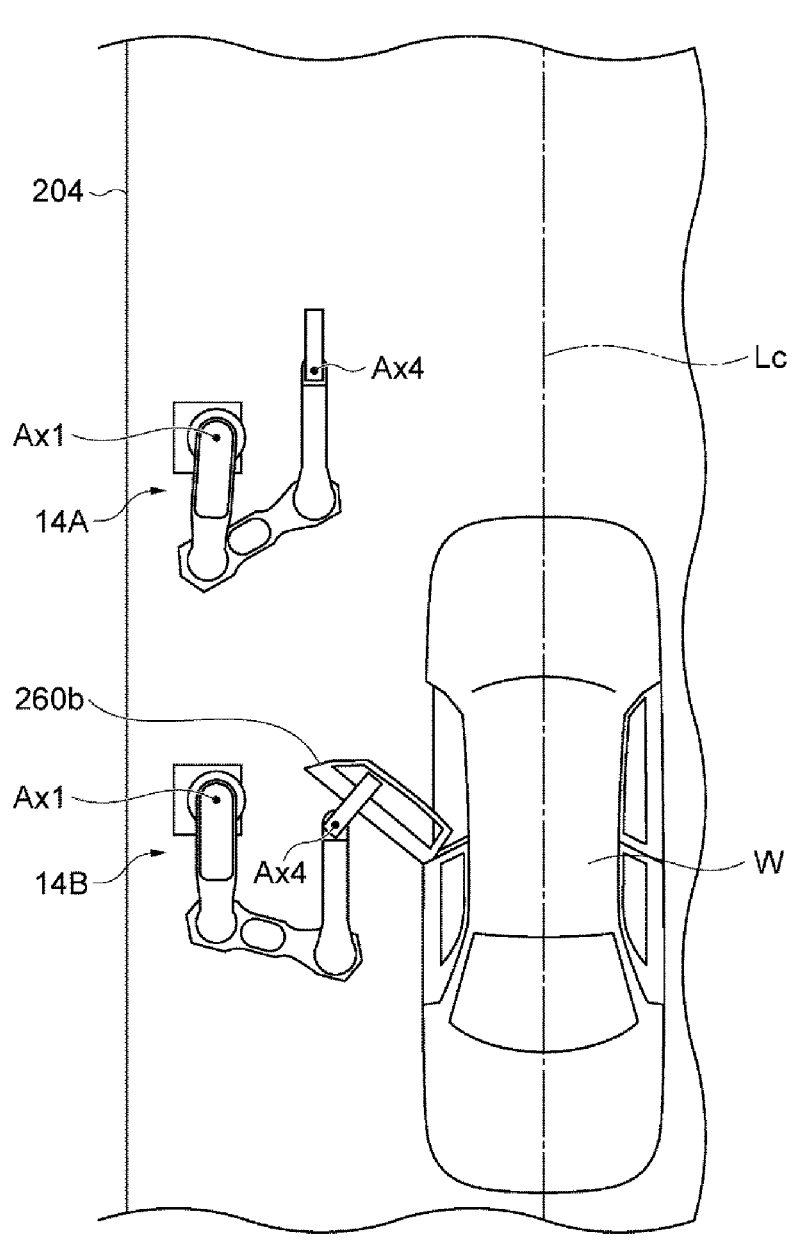
FIG. 23 is a schematic view illustrating an embodiment of the operation of the door opening/closing robot.

Next, the control device 16 executes step S17. In step S17, for example, the control device 16 performs an opening/closing control (e.g., a fourth control) for the rear door 260b (e.g., a second door) using the door opening/closing robot 14B. The control device 16 may perform the opening/closing control for the rear door 260b in the same manner as that in steps S02 to S04 described above. Unlike step S14, after the shift to the state B, the control device 16 may start the door opening control, cause the operation state to sequentially shift to the state B, the state C, and the state D, and then, end the door following control without causing any further shift. FIG. 23 illustrates a state where the door opening/closing robot 14A is waiting, and the door opening/closing robot 14B is performing the opening/closing control for the rear door 260b.

The series of processes illustrated in respective FIGS. 11 and 21 are an embodiment, and may be changed as appropriate. In the series of processes, the control device 16 may execute one step and the subsequent step in parallel, or may execute each step in an order different from the embodiment described above. The control device 16 may omit any one of the steps, or may execute a process different from the embodiment described above in any one of the steps. In any one step of the series of processes illustrated in FIG. 21, the control device 16 may control the door opening/closing robot 14 such that each arm operates according to the operation pattern 1, the operation pattern 2, the operation pattern 3, part of the operation pattern 2, or part of the operation pattern 3.

The painting system 1 may include three or more door opening/closing robots 14 arranged between the conveying apparatus 12 and one of the pair of booth side walls 204. The painting system 1 may further include one or more door opening/closing robots 14 arranged between the conveying apparatus 12 and the other booth side wall 204. The number of one or more door opening/closing robots 14 arranged between the conveying apparatus 12 and one booth side wall 204 may be the same as the number of one or more door opening/closing robots 14 arranged between the conveying apparatus 12 and the other booth side wall 204.

An embodiment of the door opening/closing robot 14 described above includes the base 20, the first arm (30, 30B), the second arm (40, 40A, 40B), the third arm (50, 50A, 50B), and the fourth arm 60. The base 20 is provided at a position different from the conveyance line Lc along which the vehicle body 250 of the work target is conveyed. The first arm (30, 30B) is attached to the base 20 to rotate around the vertical rotation axis Ax1, and extends away from the rotation axis Ax1. The second arm (40, 40A, 40B) is attached to the first arm (30, 30B) to rotate around the rotation axis Ax2 parallel to the rotation axis Ax1, and extends away from the rotation axis Ax2. The third arm (50, 50A, 50B) is attached to the second arm (40, 40A, 40B) to rotate around the rotation axis Ax3 parallel to the rotation axis Ax1, and extends away from the rotation axis Ax3. The fourth arm 60 is attached to the third arm (50, 50A, 50B) to extend in the vertical direction at the distal end (54, 54A, 54B) of the third arm (50, 50A, 50B), and vertically moves the tool 70 capable of holding the door 260 attached to the vehicle body 250. In the vertical direction, at least a portion of the connection section (CS, CSA, CSB) including the distal end (44, 44A, 44B) of the second arm (40, 40A, 40B) and the proximal end (52, 52A, 52B) of the third arm (50, 50A, 50B) is positioned at the same height as at least a portion of the base 20.

Since the door opening/closing robot 14 includes the three arms that rotate around the vertical rotation axes, the door opening/closing robot 14 may maintain the opened state of the door 260 in a wide range while following the vehicle body 250 that is being conveyed, even though the base 20 of the door opening/closing robot 14 is attached to a predetermined position. Further, since at least a portion of the connection section (CS, CSA, CSB) is positioned at the same height as at least a portion of the base 20, the door opening/closing robot 14 may have the reduced size in the vertical direction and avoid the interference with other members, even though the three arms are provided. As a result, the base 20 may be provided close to the conveyance line Lc along which the vehicle body 250 is conveyed. Therefore, the door opening/closing robot 14 is useful for saving the space of the region for performing the painting.

The second arm (40, 40A, 40B) and the third arm (50, 50A, 50B) may be arranged to operate below the door 260 held by the tool 70. In this case, when the second arm (40, 40A, 40B) and the third arm (50, 50A, 50B) operate, the interference with the workpiece W may be avoided, so that the base 20 may be disposed close to the conveyance line Lc. Therefore, the door opening/closing robot 14 is useful for saving the space of the region for performing the painting on the workpiece W.

In the vertical direction, the uppermost position of the second arm (40, 40A, 40B) other than the distal end (44, 44A, 44B) and the uppermost portion of the third arm (50, 50A, 50B) other than the proximal end (52, 52A, 52B) may be lower than the uppermost position of the connection section (CS, CSA, CSB). In this case, the connection section (CS, CSA, CSB) is the highest in the second arm (40, 40A, 40B) and the third arm (50, 50A, 50B), but the height position of the connection section (CS, CSA, CSB) falls in the height range of the base 20 as described above. Thus, it is possible to widen the operation region of other members (e.g., the painting robot) in the region above the second arm (40, 40A, 40B) and the third arm (50, 50A, 50B). Therefore, the interference between other members and the door opening/closing robot 14 may be avoided.

In the vertical direction, the connected portion between the first arm (30, 30B) and the second arm (40, 40A, 40B) and at least a portion of the connection section (CS, CSA, CSB) may be positioned at the same height. In this case, the vertical size of the portion including the first arm (30, 30B), the second arm (40, 40A, 40B), and the third arm (50, 50A, 50B) is reduced. Therefore, the door opening/closing robot 14 may be downsized.

An embodiment of the door opening/closing robot 14 described above includes: the base 20 provided at a position different from the conveyance line Lc along which the vehicle body 250 of the work target is conveyed; the first arm (30, 30B) attached to the base 20 to rotate around the vertical rotation axis Ax1, and extending away from the rotation axis Ax1; the second arm (40, 40A, 40B) attached to the first arm (30, 30B) to rotate around the rotation axis Ax2 parallel to the rotation axis Ax1, and extending away from the rotation axis Ax2; the third arm (50, 50A) attached to the second arm (40, 40A, 40B) to rotate around the rotation axis Ax3 parallel to the rotation axis Ax1, and extending away from the rotation axis Ax3; and the fourth arm 60 that is attached to the third arm (50, 50A, 50B) to extend in the vertical direction at the distal end (54, 54A, 54B) of the third arm (50, 50A, 50B), and vertically moves the tool 70 capable of holding the door 260 attached to the vehicle body 250. The fourth arm 60 holds the tool 70 to be movable up and down such that the tool 70 may pass through the window frame 262 of the door 260. In the vertical direction, the connected portion between the third arm (50, 50A, 50B) and the fourth arm 60 is lower than the uppermost position of the second arm (40, 40A, 40B) and the third arm (50, 50A, 50B). The second arm (40, 40A, 40B) and the third arm (50, 50A, 50B) are provided to operate below the door 260 of the vehicle body 250 that is being conveyed along the conveyance line Lc. In the vertical direction, at least a portion of the distal end (54, 54A, 54B) of the third arm (50, 50A, 50B) and at least a portion of the second arm (40, 40A, 40B) may be positioned at the same height.

Since the door opening/closing robot 14 above includes the three arms that rotate around the vertical rotation axes, the door opening/closing robot 14 may maintain the opened state of the door 260 in a wide range while following the vehicle body 250 that is being conveyed, even though the door opening/closing robot 14 itself (e.g., an entire body) is not moved in the X-axis direction by an apparatus or the like for conveying the door opening/closing robot 14 as in the related art. Since the connected portion between the third arm and the fourth arm is lower than the uppermost position of the second arm and the third arm, the vertical size of the door opening/closing robot 14 is reduced, even when the range of the upward/downward movement of the tool 70 by the fourth arm increases. With the reduced vertical size, the second arm and the third arm may operate below the door 260. In the vertical direction, at least a portion of the distal end of the third arm and at least a portion of the second arm are positioned at the same height, so that the vertical size of the door opening/closing robot 14 is small. As a result, the interference with other members may be avoided, and the door opening/closing robot 14 may be disposed close to the conveyance line Lc along which the vehicle body 250 is conveyed. Therefore, the door opening/closing robot 14 is useful for saving the space of the painting region.

The second arm (40, 40A, 40B) and the third arm (50, 50A, 50B) may be provided to operate below the vehicle body 250 that is being conveyed along the conveyance line Lc. In this case, the interference with the workpiece W may be avoided even though the door opening/closing robot 14 is disposed close to the conveyance line Lc. Further, since the second arm and the third arm are arranged at the low position, the range in which the arms interfere with the painting robot during the opening of the door is reduced. Therefore, the door opening/closing robot 14 is more useful for saving the space of the painting region.

The second arm 40 may be attached to the lower surface of the distal end 34 of the first arm 30. The third arm 50 may be attached to the upper surface of the distal end 44 of the second arm 40. In this case, the vertical size of the portion including the first arm, the second arm, and the third arm may be reduced. Therefore, the door opening/closing robot 14 may be downsized.

In the vertical direction, the distal end 54 of the third arm 50 may be lower than the proximal end 52 of the third arm 50. In this case, the range of the upward/downward movement of the tool 70 by the fourth arm 60 increases, as compared with a case where the distal end 54 is positioned at the same height as the proximal end 52. With the increased range of the upward/downward movement of the tool 70, the work may be performed for more types of vehicle bodies 250 (e.g., workpieces W) using the same door opening/closing robot 14. Therefore, the door opening/closing robot 14 may be shared.

In the vertical direction, the uppermost position of the second arm 40 may be lower than the uppermost position of the lower surface of the portion of the first arm 30 between the proximal end 32 and the distal end 34 (e.g., intermediate section 36). In this case, when the second arm 40 is bent to approach the first arm 30, the first arm 30 and the second arm 40 hardly interfere with each other. Therefore, the movable range of the second arm 40 may be expanded.

The second arm 40A may be attached to the lower surface of the distal end 34 of the first arm 30. The third arm 50A may be attached to the lower surface of the distal end 44A of the second arm 40A. Unlike the configuration where the second arm 40 and the third arm 50 are provided, the third arm 50A may be formed linearly when the distal end of the third arm is lowered. Therefore, the third arm may be simplified.

In the vertical direction, the distal end 44A of the second arm 40A may be higher than the proximal end 42A of the second arm 40A. In this case, the range of the upward/downward movement of the tool 70 by the fourth arm 60 increases, as compared with a case where the distal end 44A is positioned at the same height as the proximal end 42A. With the increased range of the upward/downward movement of the tool 70, the work may be performed for more types of vehicle bodies 250 (e.g., workpieces W) using the same door opening/closing robot 14. Therefore, the door opening/closing robot 14 may be shared.

The second arm 40B may be attached to the upper surface of the distal end 34B of the first arm 30B. The third arm 50B may be attached to the lower surface of the distal end 44B of the second arm 40B. Unlike the configuration where the second arm 40 and the third arm 50 or the second arm 40A and the third arm 50A are provided, the second arm 40B and the third arm 50B may be formed linearly when the distal end of the third arm is lowered. Therefore, the second arm and the third arm may be simplified.

In the vertical direction, the distal end 34B of the first arm 30B may be lower than the proximal end 32B of the first arm 30B. In this case, the range of the upward/downward movement of the tool 70 by the fourth arm 60 increases, as compared with a case where the distal end 34B is positioned at the same height as the proximal end 32B. With the increased range of the upward/downward movement of the tool 70, the work may be performed for more types of vehicle bodies 250 (e.g., workpieces W) using the same door opening/closing robot 14. Therefore, the door opening/closing robot 14 may be shared.

The first arm (30, 30B) may be attached to the upper surface of the base 20. In this case, since the base 20 is simplified, the door opening/closing robot 14 may be downsized.

In the vertical direction, at least a portion of the second arm (40, 40A, 40B) and at least a portion of the base 20 may be positioned at the same height. In this case, the vertical size of the door opening/closing robot 14 may be reduced. Therefore, the door opening/closing robot 14 may be downsized.

In the vertical direction, the uppermost position of the proximal end (32, 32B) of the first arm (30, 30B) may be lower than the lowermost position of the door 260 of the vehicle body 250 that is being conveyed along the conveyance line Lc. In this case, the interference between other members such as the workpiece W and the first arm (30, 30B) may easily be avoided, so that the door opening/closing robot 14 may be disposed close to other members. Therefore, the painting region may be suppressed from being widened due to the operation of the door opening/closing robot 14.

In the vertical direction, the uppermost position of the second arm (40, 40A, 40B) and the uppermost position of the third arm (50, 50A, 50B) may be lower than the lowermost position of the door 260 of the vehicle body 250 that is being conveyed along the conveyance line Lc. In the vertical direction, the lowermost position of the second arm (40, 40A, 40B) and the lowermost position of the third arm (50, 50A, 50B) may be higher than the booth bottom wall 202 on which the conveying apparatus 12 is provided to convey the vehicle body 250 along the conveyance line Lc. In the vertical direction, at least a portion of the proximal end (32, 32B) of the first arm (30, 30B) may be positioned at the same height as the lowermost position of the door 260 of the vehicle body 250 that is being conveyed along the conveyance line Lc. In this case, since the second arm and the third arm operate in the region between the lower end of the door 260 and the booth bottom wall 202, the arms hardly interfere with other members such as the workpiece W. Further, since the proximal end (32, 32B) of the first arm (30, 30B) is disposed in the same height range as the lower end of the door 260, the horizontal size of the proximal end (32, 32B) may be reduced. Therefore, the interference between the door opening/closing robot 14 and other members may be prevented, and the door opening/closing robot 14 may be downsized.

In the vertical direction, the uppermost position of the second arm (40, 40A, 40B) and the uppermost position of the third arm (50, 50A, 50B) may be lower than the uppermost position of the first arm (30, 30B). In this case, a region where other members may operate is formed beside the region where the first arm (30, 30B) operates. Therefore, the interference with other members may be avoided.

In the vertical direction, the lowermost position of the second arm (40, 40A, 40B) and the lowermost position of the third arm (50, 50A, 50B) may substantially coincide with each other. In this case, the vertical size of the door opening/closing robot 14 may be reduced. Therefore, the door opening/closing robot 14 may be downsized.

The base 20 may be provided such that its side surface (e.g., the side surface 24*a*) with the shortest distance from the rotation axis Ax1 faces the conveyance line Lc when viewed in the vertical direction. In this case, it is possible to reduce the portion projecting toward the conveyance line Lc from the rotation axis Ax1 between the base 20 and the conveyance line Lc. Thus, the interference with the workpiece W may be avoided, even though the base 20 is disposed close to the conveyance line Lc. Therefore, the door opening/closing robot 14 is useful for saving the space of the painting region in the width direction orthogonal to the conveyance line Lc.

The door opening/closing robot 14 may further include the motor M1 that generates the first driving force for rotating the first arm 30 around the rotation axis Ax1, and the motor M2 that generates the second driving force for rotating the second arm 40 around the rotation axis Ax2. The motors M1 and M2 may be disposed in the first arm 30. In this case, as compared with a case where the motors are disposed in the base 20, the base 20 may be simplified, so that the work on the motors M1 and M2 is facilitated. Therefore, the base 20 may be downsized, and the maintainability may be improved.

The motor M1 may include the motor body 81*a* and the output shaft 81*b*. The motor M2 may include the motor body 82*a* and the output shaft 82*b*. The motor M1 may be attached from above with the output shaft 81*b* directed downward. The motor M2 may be attached from above with the output shaft 82*b* directed downward. In the case, the motors M1 and M2 may easily be removed. Therefore, the maintainability may be improved.

The door opening/closing robot 14 may further include the motor M3 that generates the third driving force for rotating the third arm 50 around the rotation axis Ax3. The motor M3 may be disposed in the second arm 40 such that the distance between the motor M3 and the rotation axis Ax2 is shorter than the distance between the motor M3 and the rotation axis Ax3. In this case, it is possible to avoid the reduction of the movable range of the third arm 50 due to the disposition of the motor M3, so that the moment of inertia may be reduced.

The motor M3 may include the motor body 83*a* and the output shaft 83*b*. The motor M3 may be attached from above with the output shaft 83*b* directed downward. In the case, the motor M3 may easily be removed. Therefore, the maintainability may be improved.

The lateral portions 43 of the second arm 40 may be recessed inward when viewed in the vertical direction. In this case, when the third arm 50 is bent to approach the second arm 40, the second arm 40 and the third arm 50 hardly interfere with each other. Therefore, the movable range of the third arm 50 may be widened.

The fourth arm 60 may be attached to the distal end (54, 54A, 54B) of the third arm (50, 50A, 50B) to rotate together with the tool 70 around the rotation axis Ax4 (e.g., the fourth axis) parallel to the rotation axis Ax1. In this case, when the door 260 is opened by the tool 70, the posture of the tool 70 is adjusted by rotating the fourth arm 60 around the rotation axis Ax4. Therefore, the operations of the arms other than the fourth arm 60 may be simplified.

The door opening/closing robot 14 may further include the motor M4 that generates the fourth driving force for rotating the fourth arm 60 around the rotation axis Ax4, and the motor M5 that generates the fifth driving force for rotating the tool 70 along the vertical direction. The motors M4 and M5 may be disposed in the third arm 50. In this case, the fourth arm 60 may be downsized, as compared with a case where at least one of the motors M4 and M5 is disposed in the fourth arm 60. As a result, the operation range of the fourth arm 60 may be reduced. For example, when the pressure inside the door opening/closing robot is increased, the pressure inside the fourth arm 60 does not need to be increased because no motor is provided in the fourth arm 60. Therefore, the door opening/closing robot 14 may be simplified.

The motor M4 may include the motor body 84*a* and the output shaft 84*b*. The motor M5 may include the motor body 85*a* and the output shaft 85*b*. The motor M4 may be attached from above with the output shaft 84*b* directed downward. The motor M5 may be attached from above with the output shaft 85*b* directed downward. In this case, the motors M4 and M5 may easily be removed. Therefore, the maintainability may be improved.

The fourth arm 60 may include the fixed part 62 attached to the distal end (54, 54A, 54B) of the third arm (50, 50A, 50B) and rotatable around the rotation axis Ax4, and the movable part 64 rotatable together with the fixed part 62 around the rotation axis Ax4 by the rotation of the fixed part 62 and provided in the fixed part 62 to be movable up and down. The tool 70 may be attached to the movable part 64. In this case, as the tool 70 moves up and down, the posture of the tool 70 around the rotation axis Ax4 changes. Therefore, it is possible to adjust the position of the tool 70 in the vertical direction and the posture of the tool 70 about the rotation axis Ax4 according to a desired control.

The fourth arm 60 may further include the cover 68 that covers at least a portion of the fixed part 62 and moves up and down together with the movable part 64. In this case, the paint used for the painting hardly enters the fourth arm 60, despite the configuration where the tool 70 moves up and down. Therefore, the deterioration of the door opening/closing robot 14 may be suppressed, and the maintainability may be improved.

The arm length L2 of the second arm 40 may be 0.9 to 1.1 times the arm length L1 of the first arm 30. The arm length L3 of the third arm 50 may be 0.9 to 1.1 times the arm length L1 of the first arm 30. In a case where the arm length L1 of the first arm 30 is overly longer than the arm length L2, the second arm 40 is highly likely to interfere with the workpiece W when the first arm 30 is positioned at an angle along the Y-axis direction on the assumption that the position of the base 20 is the same. In a case where the arm length L1 is overly shorter than the arm length L2, at least one of the arm lengths L2 and L3 needs to be increased in order to make the total value of the arm lengths constant. In a case where at least one of the arm lengths L2 and L3 is long, the connected portion between the second arm 40 and the third arm 50 may project toward the conveyance line Lc and is highly likely to interfere with the workpiece W, when the tool 70 holds the door 260 at an upstream side of the base 20. Meanwhile, in the configuration described above, the lengths of the arms are substantially equal to each other, so that the interference between each arm and the workpiece W may be avoided.

In the base 20, any of the bottom surface 22 and the side surface (e.g., the side surface 24*b*) may be attachable to a predetermined position. In this case, the same type of door opening/closing robot 14 may be attached to any of the bottom surface 22 and the side surface. Therefore, the door opening/closing robot 14 may be shared.

The side surface (e.g., the side surface 24*b*) of the base 20 may be attached to the support column 208 included in the booth side wall 204 that extends along the conveyance line Lc and makes up the painting region R for painting the workpiece W including the vehicle body 250 and the door 260. In this case, the tool 70 may easily be moved upward to a higher position than that in a case where the base 20 is fixed to the bottom wall. Therefore, the door opening/closing robot 14 is useful for performing the work on the vehicle body 250 with the lower end of the window frame 262 positioned at a high position.

The bottom surface 22 of the base 20 may be attached to the booth bottom wall 202 (e.g., a portion of the booth bottom wall 202) between the vehicle body 250 being conveyed along the conveyance line Lc and the booth side wall 204 that extends along the conveyance line Lc and makes up the painting region R for performing the painting on the workpiece W including the vehicle body 250 and the door 260. In this case, since the bottom surface 22 of the base 20 is supported, the installation of the base 20 is stable. Therefore, the door opening/closing robot 14 may be stabilized.

Between the booth side wall 204 that extends along the conveyance line Lc and makes up the painting region R for performing the painting on the workpiece W including the vehicle body 250 and the door 260, and the side surface of the vehicle body 250 that is being conveyed along the conveyance line Lc, the base 20 may be disposed near the booth side wall 204. In this case, a larger space is formed between the base 20 and the side surface of the vehicle body 250 than that between the base 20 and the booth side wall 204. Thus, when the workpiece W passes beside the base 20, each arm included in the door opening/closing robot 14 hardly interferes with the opened door 260. Therefore, it is possible to simplify the operation of maintaining the opened state of the door 260 while following the vehicle body 250.

The tool 70 may include the extension part 72 that extends along the direction intersecting the vertical direction, and the holding part 74 that extends downward from the extension part 72 and is capable of coming into contact with the inner surface 264 of the door 260. The fourth arm 60 may move the tool 70 along the vertical direction such that the holding part 74 may pass through the window frame 262 of the door 260 in a state of being moved up above the lower end of the window frame 262 of the door 260. In this case, since the inner surface 264 of the door 260 is held by the tool 70, the operation of opening the door 260 is stable. Therefore, the painting work may be stably performed in the opened state of the door 260.

An embodiment of the door opening/closing system 10 described above includes the door opening/closing robot 14, the conveying apparatus 12 that conveys the vehicle body 250 along the conveyance line Lc, and the control device 16 that controls the door opening/closing robot 14 to open/close the door 260 of the vehicle body 250 being conveyed by the conveying apparatus 12. In this case, the painting may be performed on the workpiece W including the vehicle body 250 and the door 260 in the opened state of the door 260 in cooperation with the painting robot. Therefore, the painting work that is performed while conveying the vehicle body 250 may be automatized.

According to the present disclosure, it is possible to provide a door opening/closing robot and a door opening/closing system, which are useful for a space saving.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A door opening/closing robot comprising:
a base provided at a position different from a conveyance line on which a vehicle body is conveyed;
a first arm attached to the base to rotate around a first axis extending along a vertical direction, and extending away from the first axis;
a second arm attached to the first arm to rotate around a second axis parallel to the first axis, and extending away from the second axis;
a third arm attached to the second arm to rotate around a third axis parallel to the first axis, and extending in a direction intersecting the third axis and away from the third axis; and
a fourth arm attached to the third arm to extend along the vertical direction at a distal end of the third arm, and configured to move a tool capable of holding a door attached to the vehicle body along the vertical direction and rotate around a fourth axis parallel to the first axis,
wherein in the vertical direction, at least a portion of a connection area including a distal end of the second arm and a proximal end of the third arm is positioned at a same height as at least a portion of the base.

2. The door opening/closing robot according to claim 1, wherein the second arm and the third arm are provided to operate below the door held by the tool.

3. The door opening/closing robot according to claim 1, wherein in the vertical direction, an uppermost position of a portion of the second arm other than the distal end and an uppermost position of a portion of the third arm other than the proximal end are lower than an uppermost position of the connection area.

4. The door opening/closing robot according to claim 1, wherein in the vertical direction, a connected portion between the first arm and the second arm is positioned at a same height as at least a portion of the connection area.

5. A door opening/closing robot comprising:
a base provided at a position different from a conveyance line on which a vehicle body is conveyed;

a first arm attached to the base to rotate around a first axis extending along a vertical direction, and extending away from the first axis;

a second arm attached to the first arm to rotate around a second axis parallel to the first axis, and extending away from the second axis;

a third arm attached to the second arm to rotate around a third axis parallel to the first axis, and extending in a direction intersecting the third axis and away from the third axis; and a fourth arm attached to the third arm to extend along the vertical direction at a distal end of the third arm, and configured to move a tool capable of holding a door attached to the vehicle body along the vertical direction and rotate around a fourth axis parallel to the first axis, wherein the fourth arm holds the tool to be movable up and down such that the tool passes through a window frame of the door, in the vertical direction, a connected portion between the third arm and the fourth arm is lower than an uppermost position of the second arm and the third arm, the second arm and the third arm are provided to operate below the door of the vehicle body that is being conveyed along the conveyance line, and in the vertical direction, at least a portion of the distal end of the third arm and at least a portion of the second arm are positioned at a same height.

6. The door opening/closing robot according to claim 5, wherein in the vertical direction, a connected portion between the first arm and the second arm is positioned at a same height as at least a portion of a connection area including a distal end of the second arm and a proximal end of the third arm.

7. The door opening/closing robot according to claim 1, wherein the second arm and the third arm are provided to operate below the vehicle body that is being conveyed along the conveyance line.

8. The door opening/closing robot according to claim 1, wherein the second arm is attached to a lower surface of a distal end of the first arm, and the third arm is attached to an upper surface of the distal end of the second arm.

9. The door opening/closing robot according to claim 8, wherein in the vertical direction, the distal end of the third arm is lower than the proximal end of the third arm.

10. The door opening/closing robot according to claim 8, wherein in the vertical direction, an uppermost position of the second arm is lower than an uppermost position of a lower surface of the first arm between a proximal end and the distal end of the first arm.

11. The door opening/closing robot according to claim 1, wherein the second arm is attached to a lower surface of a distal end of the first arm, and the third arm is attached to a lower surface of the distal end of the second arm.

12. The door opening/closing robot according to claim 11, wherein in the vertical direction, the distal end of the second arm is higher than a proximal end of the second arm.

13. The door opening/closing robot according to claim 1, wherein the second arm is attached to an upper surface of a distal end of the first arm, and the third arm is attached to a lower surface of the distal end of the second arm.

14. The door opening/closing robot according to claim 13, wherein in the vertical direction, the distal end of the first arm is lower than a proximal end of the first arm.

15. The door opening/closing robot according to claim 1, wherein the first arm is attached to an upper surface of the base.

16. The door opening/closing robot according to claim 1, wherein in the vertical direction, at least a portion of the second arm and at least a portion of the base are positioned at a same height.

17. The door opening/closing robot according to claim 1, wherein in the vertical direction, an uppermost position of a distal end of the first arm is lower than a lowermost position of the door of the vehicle body that is being conveyed along the conveyance line.

18. The door opening/closing robot according to claim 1, wherein in the vertical direction, an uppermost position of the second arm and an uppermost position of the third arm are lower than a lowermost position of the door of the vehicle body that is being conveyed along the conveyance line, in the vertical direction, a lowermost position of the second arm and a lowermost position of the third arm are higher than a booth bottom wall on which a conveying apparatus is provided to convey the vehicle body along the conveyance line, and in the vertical direction, at least a portion of a proximal end of the first arm is positioned at a same height as the lowermost position of the door of the vehicle body that is being conveyed along the conveyance line.

19. The door opening/closing robot according to claim 1, wherein in the vertical direction, an uppermost position of the second arm and an uppermost position of the third arm are lower than an uppermost position of the first arm.

20. The door opening/closing robot according to claim 1, wherein in the vertical direction, a lowermost position of the second arm and a lowermost position of the third arm substantially coincide with each other.

21. The door opening/closing robot according to claim 1, wherein when viewed in the vertical direction, the base is provided in such a way that a side surface thereof having a shortest distance from the first axis faces the conveyance line.

22. The door opening/closing robot according to claim 1, further comprising:

a first motor configured to generate a first driving force for rotating the first arm around the first axis; and a second motor configured to generate a second driving force for rotating the second arm around the second axis, wherein the first motor and the second motor are disposed in the first arm.

23. The door opening/closing robot according to claim 22, wherein the first motor includes a first motor body and a first output shaft, the second motor includes a second motor body and a second output shaft, the first motor is attached from above with the first output shaft directed downward, and the second motor is attached from above with the second output shaft directed downward.

24. The door opening/closing robot according to claim 1, further comprising:

a third motor configured to generate a third driving force for rotating the third arm around the third axis, wherein the third motor is disposed in the second arm such that a distance between the third motor and the second axis is shorter than a distance between the third motor and the third axis.

25. The door opening/closing robot according to claim 24, wherein the third motor includes a third motor body and a third output shaft, and the third motor is attached from above with the third output shaft directed downward.

26. The door opening/closing robot according to claim 1, wherein in the vertical direction, a lateral side of the second arm is recessed toward an inward direction.

27. The door opening/closing robot according to claim 1, wherein the fourth arm is attached to the distal end of the third arm to rotate together with the tool around a fourth axis parallel to the first axis.

28. The door opening/closing robot according to claim 27, further comprising:

a fourth motor configured to generate a fourth driving force for rotating the fourth arm around the fourth axis; and a fifth motor configured to generate a fifth driving force for moving the tool along the vertical direction, wherein the fourth motor and the fifth motor are disposed in the third arm.

29. The door opening/closing robot according to claim 28, wherein the fourth motor includes a fourth motor body and a fourth output shaft, the fifth motor includes a fifth motor body and a fifth output shaft, the fourth motor is attached from above with the fourth output shaft directed downward, and the fifth motor is attached from above with the fifth output shaft directed downward.

30. The door opening/closing robot according to claim 27, wherein the fourth arm includes a first part attached to the distal end of the third arm and rotatable around the fourth axis, and a second part rotatable together with the first part around the fourth axis by a rotation of the first part, and provided at the first part to be movable up and down, and the tool is attached to the second part.

31. The door opening/closing robot according to claim 30, wherein the fourth arm further includes a cover configured to cover at least a portion of the first part from above and to move up and down together with the second part.

32. The door opening/closing robot according to claim 1, wherein an arm length of the second arm is 0.9 to 1.1 times an arm length of the first arm, and an arm length of the third arm is 0.9 to 1.1 times the arm length of the first arm.

33. The door opening/closing robot according to claim 1, wherein each of a bottom surface and a side surface of the base is attachable to a predetermined position.

34. The door opening/closing robot according to claim 1, wherein a side surface of the base is attached to a support column included in a booth side wall that extends along the conveyance line and makes up a region for performing a painting on a workpiece including the vehicle body and the door.

35. The door opening/closing robot according to claim 1, wherein a bottom surface of the base is attached to a booth bottom wall between the vehicle body that is being conveyed along the conveyance line and a booth side wall that extends along the conveyance line making up a region for performing a painting on a workpiece including the vehicle body and the door.

36. The door opening/closing robot according to claim 1, wherein the base is disposed near a booth side wall between the booth side wall that extends along the conveyance line and makes up a region for performing a painting on a workpiece including the vehicle body and the door, and a side surface of the vehicle body that is being conveyed along the conveyance line.

37. The door opening/closing robot according to claim 1, wherein the tool includes an extension extending along a direction intersecting the vertical direction, and a holder extending downward from the extension and capable of coming into contact with an inner surface of the door, and the fourth arm moves the tool along the vertical direction such that the holder passes through a window frame of the door in a state of being moved upward above a lower end of the window frame of the door.

38. A door opening/closing system comprising:

the door opening/closing robot according to claim 1;

a conveyer configured to convey the vehicle body along the conveyance line; and a controller configured to control the door opening/closing robot to open/close the door of the vehicle body.

* * * * *